US010945179B2

(12) United States Patent
Xu et al.

(10) Patent No.: US 10,945,179 B2
(45) Date of Patent: Mar. 9, 2021

(54) COMMUNICATION PATH SWITCHING METHOD AND DEVICE

(71) Applicant: Huawei Technologies Co., Ltd., Shenzhen (CN)

(72) Inventors: Haibo Xu, Beijing (CN); Yiru Kuang, Beijing (CN); Nathan Edward Tenny, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/476,740

(22) PCT Filed: Jun. 30, 2017

(86) PCT No.: PCT/CN2017/091138
§ 371 (c)(1),
(2) Date: Jul. 9, 2019

(87) PCT Pub. No.: WO2018/129875
PCT Pub. Date: Jul. 19, 2018

(65) Prior Publication Data
US 2019/0387446 A1    Dec. 19, 2019

(30) Foreign Application Priority Data

Jan. 10, 2017  (CN) ........................ 201710018783.X
Feb. 3, 2017   (WO) ................ PCT/CN2017/072864

(51) Int. Cl.
*H04W 4/00*        (2018.01)
*H04W 36/18*       (2009.01)
(Continued)

(52) U.S. Cl.
CPC ....... *H04W 36/18* (2013.01); *H04W 36/0016* (2013.01); *H04W 36/0061* (2013.01); *H04W 36/14* (2013.01); *H04W 88/04* (2013.01)

(58) Field of Classification Search
None
See application file for complete search history.

(56) References Cited

U.S. PATENT DOCUMENTS

2010/0142405 A1   6/2010  Cai et al.
2010/0322193 A1*  12/2010 Hu ..................... H04B 7/155
                                                        370/331
(Continued)

FOREIGN PATENT DOCUMENTS

CN    101132601 A    2/2008
CN    102215537 A    10/2011
(Continued)

OTHER PUBLICATIONS

LG Electronics Inc., et al.,"Path switch scenarios", 3GPP TSG-RAN2 Meeting #96, R2-168772, Reno, Nov. 14-18, 2016, 4 pages.
(Continued)

*Primary Examiner* — Phirin Sam
(74) *Attorney, Agent, or Firm* — Slater Matsil, LLP

(57) ABSTRACT

A communication path switching method includes: sending, by first user equipment, a first message to a first network device, where the first message is used to request to switch a communication path of the first user equipment from a direct path to an indirect path; receiving, by the first user equipment, a second message sent by the first network device, where the second message carries at least one of first bearer configuration information and first indication information that is used to instruct the first user equipment to perform the communication path switching; and performing, by the first user equipment, the communication path switching based on the first indication information.

17 Claims, 12 Drawing Sheets

(51) Int. Cl.
*H04W 36/00* (2009.01)
*H04W 36/14* (2009.01)
*H04W 88/04* (2009.01)

(56) References Cited

U.S. PATENT DOCUMENTS

| | | | |
|---|---|---|---|
| 2013/0195005 A1* | 8/2013 | Al-Shalash | H04W 36/18 370/315 |
| 2016/0029429 A1 | 1/2016 | Peng et al. | |
| 2016/0192422 A1 | 6/2016 | Liu | |
| 2017/0071028 A1* | 3/2017 | Kuo | H04W 8/06 |
| 2017/0094656 A1* | 3/2017 | Chen | H04W 76/14 |
| 2017/0111273 A1* | 4/2017 | Kuge | H04L 45/74 |
| 2017/0302360 A1 | 10/2017 | Aminaka | |
| 2017/0367140 A1* | 12/2017 | Naqvi | H04L 67/14 |
| 2018/0213577 A1* | 7/2018 | Burbidge | H04W 76/10 |
| 2019/0109631 A1* | 4/2019 | Basu Mallick | H04W 52/0229 |

FOREIGN PATENT DOCUMENTS

| | | |
|---|---|---|
| CN | 103442397 A | 12/2013 |
| CN | 103813413 A | 5/2014 |
| CN | 104066126 A | 9/2014 |
| CN | 104284321 A | 1/2015 |
| CN | 104349405 A | 2/2015 |
| CN | 104427489 A | 3/2015 |
| CN | 104618891 A | 5/2015 |
| CN | 104936267 A | 9/2015 |
| CN | 105050152 A | 11/2015 |
| WO | 2016056154 A1 | 4/2016 |
| WO | 2016073984 A2 | 5/2016 |
| WO | 2016197365 A1 | 12/2016 |

OTHER PUBLICATIONS

Ericsson, "User plane architecture", 3GPP TSG-RAN WG2 #96, Reno, R2-168214, Nevada, Nov. 14-18, 2016, 6 pages.
Kyocera, "Consideration of the L2 relay bearer modelling", 3GPP TSG-RAN WG2 #96, R2-168397, Reno, Nov. 14-18, 2016, 4 pages.
Huawei et al., "Revised SI: Further Enhancements LTE Device to Device, UE to Network Relays for IoT and Wearables", 3GPP TSG RAN Meeting #73, RP-161839, New Orleans, Sep. 19-22, 2016, 8 pages.
Intel, "Motivation for SI: Further LTE D2D Enhancements for Wearables and MTC", 3GPP TSG RAN Meeting #71, RP-160427, Göteborg, Sweden, Mar. 7-10, 2016, 14 pages.
Ericsson, "Service Continuity and Mobility", 3GPP TSG-RAN WG2 #96, R2-168213, Reno, Nevada, Nov. 14-18, 2016, 6 pages.
Huawei et al.,"Path switch procedure from cellular link to relay link", 3GPP TSG-RAN WG2 Meeting #97, R2-1701834, Athens, Greece, Feb. 13-17, 2017, 6 pages.

\* cited by examiner

COMMUNICATION PATH SWITCHING METHOD AND DEVICE

CROSS-REFERENCE TO RELATED APPLICATIONS

This application is a national stage of International Application No. PCT/CN2017/091138, filed on Jun. 30, 2017, which claims priority to Chinese Patent Application No. 201710018783.X, filed on Jan. 10, 2017 and International Patent Application No. PCT/CN2017/072864, filed on Feb. 3, 2017. All of the aforementioned applications are hereby incorporated by reference in their entireties.

TECHNICAL FIELD

The present invention relates to the field of communications technologies, and in particular, to a communication path switching method and a device.

BACKGROUND

In the long term evolution (Long Term Evolution, LTE) release 13 (Rel-13), the 3rd Generation Partnership Project (3rd Generation Partnership Project, 3GPP) studies and standardizes a user equipment-to-network relay (UE-to-Network Relay) function. To be specific, UE may be directly connected to a base station, to communicate with the base station through direct connection. Alternatively, UE may be connected to a base station by using relay UE (Relay UE) for communication, and in this case, the UE that communicates with the base station by using the relay UE may be referred to as remote UE (Remote UE).

In the Rel-13, the standardized relay UE forwards data between the remote UE and the base station by using an internet protocol (Internet Protocol, IP) layer, namely, a layer 3 (Layer 3). This architecture may be referred to as a layer 3 relay architecture. When the data between the remote UE and the base station is forwarded by using the IP layer of the relay UE, some problems exist. The problems mainly include: (1) Data security: After data of the remote UE reaches the relay UE, a packet data convergence protocol (Packet Data Convergence Protocol, PDCP) layer of the relay UE parses out the data of the remote UE, re-encapsulates the data, and forwards the data to the base station. In other words, the relay UE learns content of the data. Therefore, security of the data of the remote UE cannot be ensured at the relay UE. (2) Service continuity: If the remote UE needs to perform path switching, for example, switch from a cellular link between the remote UE and the base station to a relay link used for communicating with the base station by using the relay UE, an application layer (Application layer) of the remote UE generally autonomously determines when to switch data communication from the cellular link to the relay link, and service continuity before and after the switching cannot be ensured.

Then, to resolve the data security problem and other problems existing when the data between the remote UE and the base station is transmitted by using the relay UE, a manner in which data relay may be performed above a radio link control (Radio Link Control, RLC) layer and below the PDCP layer is proposed currently, and this manner is a current research subject in the LTE Rel 15. This manner in which data is forwarded above the RLC layer and below the PDCP layer of the relay UE may be referred to as layer 2 user equipment-to-network relay (Layer 2 UE-to-NW Relay). In other words, a layer that is newly added to the relay UE and that is used to forward the data to the base station may be considered as a layer 2. In this case, the remote UE may be referred to as evolved remote user equipment (Evolved Remote UE, eRemote UE), and the relay UE may be referred to as evolved relay user equipment (Evolved Relay UE, eRelay UE, or Evolved UE-to-NW Relay). For example, the newly added layer is referred to as an adaptation (adaptation) layer. To be specific, the data received from the remote UE is forwarded to the base station by using the adaptation layer of the relay UE and the data does not reach the PDCP layer. In this way, the relay UE does not obtain the content of the data, thereby ensuring security of the data at the relay UE.

However, forwarding the data by using the adaptation layer resolves only the data security problem and the service continuity problem persists. According to a current solution, if eRemote UE needs to perform path switching, for example, switch from a cellular link for direct communication between the eRemote UE and a base station to a relay link used for communicating with the base station by using eRelay UE, an application layer (Application layer) of the eRemote UE still autonomously determines when to switch data communication from the cellular link to the relay link, and service continuity before and after the switching still cannot be ensured.

SUMMARY

Embodiments of the present invention provide a communication path switching method and a device, to resolve a problem of service discontinuity occurring after eRemote UE performs link switching.

According to a first aspect, a communication path switching method is provided. The method is executed by first user equipment, and the first user equipment is, for example, eRemote UE. In addition, the method further relates to second user equipment, and the second user equipment is, for example, eRelay UE. The method includes: sending, by the first user equipment, a first message to a first network device, where the first message is used to request to switch a communication path between the first user equipment and the first network device from a direct path to an indirect path used for communicating with a second network device by using the second user equipment; receiving, by the first user equipment, a second message sent by the first network device, where the second message carries at least one of first bearer configuration information and first indication information that is used to instruct the first user equipment to perform the communication path switching; and performing, by the first user equipment, the communication path switching based on the first indication information; where the first message includes at least one of a cell identity of a serving cell of the second user equipment, an identifier of the second user equipment, an identifier of the first user equipment, and a communication technology used by a communication link between the first user equipment and the second user equipment; and the first network device and the second network device are a same network device or different network devices.

In this embodiment of the present invention, if the first user equipment requests to perform path switching, the network device sends the second message to the first user equipment, to instruct the first user equipment to switch the communication path from the direct path to the indirect path. In other words, the first user equipment does not autonomously determine when to perform the switching; instead, the network device indicates to the first user equipment when to perform the path switching. Therefore, the network device may perform scheduling based on a service, to ensure service continuity as far as possible before and after the first user equipment performs the path switching.

In addition, the first message further includes at least one of the cell identity of the serving cell of the second user equipment, the identifier of the second user equipment, and the identifier of the first user equipment. Even if data is forwarded by using an adaptation layer but not an IP layer, in a manner provided in this embodiment of the present invention, the network device can determine the second user equipment and/or the first user equipment, so that the network device may configure radio bearers/a radio bearer for the second user equipment and/or the first user equipment, or the network device may subsequently send downlink data to the second user equipment and/or the first user equipment.

With reference to the first aspect, in a first possible implementation of the first aspect, the first bearer configuration information includes a mapping relationship between at least one first radio bearer and at least one second radio bearer, and configurations of a radio link control entity and a logical channel that are corresponding to the at least one first radio bearer. The first radio bearer is a radio bearer used for the communication link between the first user equipment and the second user equipment; and the second radio bearer is a radio bearer used for a communication link between the second user equipment and the second network device.

Content included in the first bearer configuration information is described, and the first user equipment may perform configuration based on the first bearer configuration information. This is equivalent to that the network device provides a radio bearer configuration for the user equipment. The network device may configure, for the eRemote UE, a radio bearer between the eRemote UE and the eRelay UE based on a quality of service (Quality of Service, QoS) requirement of a service of the eRemote UE, thereby helping ensure service QoS of the eRemote UE.

With reference to the first possible implementation of the first aspect, in a second possible implementation of the first aspect, after the receiving, by the first user equipment, a second message sent by the first network device, the method further includes: if the second message includes the first indication information, enabling, by the first user equipment, an adaptation layer used for processing data that is transmitted between the first user equipment and the second network device by using the second user equipment; and if the second message includes the first bearer configuration information, reconfiguring, by the first user equipment, the radio link control entity and the logical channel of the first radio bearer based on the first bearer configuration information.

The first user equipment may perform corresponding processing based on information included in the second message, so as to smoothly complete the communication path switching.

With reference to the first aspect or the first possible implementation of the first aspect or the second possible implementation of the first aspect, in a third possible implementation of the first aspect, before the sending, by the first user equipment, a first message to a first network device, the method further includes: establishing, by the first user equipment, a communication connection to the second user equipment.

In one implementation, the first user equipment first establishes the communication connection to the second user equipment, and then sends the first message to the first network device.

With reference to the first aspect or the first possible implementation of the first aspect or the second possible implementation of the first aspect, in a fourth possible implementation of the first aspect, after the receiving, by the first user equipment, a second message sent by the first network device, the method further includes: establishing, by the first user equipment, a communication connection to the second user equipment.

In another implementation, the first user equipment first sends the first message to the first network device, and then establishes the communication connection to the second user equipment.

With reference to any one of the first aspect or the first possible implementation of the first aspect to the fourth possible implementation of the first aspect, in a fifth possible implementation of the first aspect, the second network device and the first network device are a same network device. Then, after the receiving, by the first user equipment, a second message sent by the first network device, the method further includes: continuing, by the first user equipment, data communication with the first network device by using the direct path; establishing, by the first user equipment, the communication connection to the second user equipment; and sending, by the first user equipment, a third message to the first network device by using the second user equipment, where the third message is used to indicate that a process of the communication path switching has been completed, and disconnecting, by the first user equipment, the direct path from the first network device.

In this implementation, the first user equipment maintains the direct path between the first user equipment and the first network device, until the communication path switching has been completed. Then, the first user equipment disconnects the direct path from the first network device, and switches to the indirect path for communication, so as to avoid service interruption of the first user equipment as far as possible and ensure service continuity.

With reference to any one of the first aspect or the first possible implementation of the first aspect to the fourth possible implementation of the first aspect, in a sixth possible implementation of the first aspect, the second network device and the first network device are different network devices, and the second message includes information used to instruct the first user equipment to hand over to the second network device. Then, after the receiving, by the first user equipment, a second message sent by the first network device, the method further includes: continuing, by the first user equipment, data communication with the first network device by using the direct path; establishing, by the first user equipment, the communication connection to the second user equipment; and sending, by the first user equipment, a third message to the second network device by using the second user equipment, where the third message is used to indicate that a process of the communication path switching has been completed, and disconnecting, by the first user equipment, the direct path from the first network device.

Even if the network device in the direct path and the network device in the indirect path are different network devices, the first user equipment can maintain the direct path between the first user equipment and the first network device, until the communication path switching has been completed. Then, the first user equipment disconnects the direct path from the first network device, and switches to the indirect path for communication, so as to avoid service interruption of the first user equipment as far as possible and ensure service continuity.

With reference to any one of the first aspect or the first possible implementation of the first aspect to the fourth possible implementation of the first aspect, in a seventh possible implementation of the first aspect, the second network device and the first network device are different network devices, and the second message includes information used to instruct the first user equipment to hand over to the second network device. Then, after the receiving, by the first user equipment, a second message sent by the first network device, the method further includes: handing over, by the first user equipment, from the first network device to the second network device based on an indication of the second message; establishing, by the first user equipment, the communication connection to the second user equipment; and sending, by the first user equipment, a third message to the second network device by using the second user equipment, where the third message is used to indicate that a process of the communication path switching has been completed.

In this implementation, if the network device in the direct path and the network device in the indirect path are different network devices, the first user equipment first performs a handover between the network devices, that is, a handover from the first network device to the second network device. Then, the first user equipment establishes the communication connection to the second user equipment, to complete the switching from the direct path to the indirect path. In other words, if the network device in the direct path and the network device in the indirect path are different network devices, the first user equipment may directly establish the connection to the second user equipment, or may be handed over to the second network device and then establish the connection to the second user equipment. Different processing manners may be flexibly selected based on different cases.

With reference to any one of the first aspect or the first possible implementation of the first aspect to the seventh possible implementation of the first aspect, in an eighth possible implementation of the first aspect, the method further includes: obtaining, by the first user equipment, the cell identity of the serving cell of the second user equipment and the identifier of the second user equipment in a discovery process between the first user equipment and the second user equipment; or obtaining, by the first user equipment, the cell identity of the serving cell of the second user equipment and the identifier of the second user equipment in a process of establishing the communication connection to the second user equipment; or obtaining, by the first user equipment, the cell identity of the serving cell of the second user equipment and the identifier of the second user equipment after establishing the communication connection to the second user equipment.

The first user equipment may obtain the cell identity of the serving cell of the second user equipment and the identifier of the second user equipment flexibly by using a plurality of different manners.

According to a second aspect, a communication path switching method is provided. The method is executed by second user equipment, and the second user equipment is, for example, eRelay UE. In addition, the method further relates to first user equipment, and the first user equipment is, for example, eRemote UE. The method includes: receiving, by the second user equipment, a fourth message sent by a second network device, where the fourth message carries third bearer configuration information, an identifier of the first user equipment, and second bearer configuration information and/or second indication information that is used to instruct the second user equipment to provide the first user equipment with indirect-path support; and configuring, by the second user equipment, a radio bearer of a communication link between the second user equipment and the first user equipment based on the identifier of the first user equipment and the second bearer configuration information and/or the second indication information, and configuring, based on the identifier of the first user equipment and the third bearer configuration information, a radio bearer used for transmitting data and signaling of the first user equipment on a communication link between the second user equipment and the second network device.

In this embodiment of the present invention, if the first user equipment requests to perform path switching, the network device sends the fourth message to the second user equipment, to instruct the second user equipment to provide the first user equipment with indirect-path support. In other words, the first user equipment does not autonomously determine when to perform the switching; instead, the network device indicates to the first user equipment and the second user equipment when to perform the path switching. Therefore, the network device may perform scheduling based on a service, to ensure service continuity as far as possible before and after the first user equipment performs the path switching.

In addition, the network device sends the bearer configuration information to the second user equipment. To be specific, the network device configures a radio bearer for the second user equipment, to ensure QoS of the first user equipment and second user equipment.

With reference to the second aspect, in a first possible implementation of the second aspect, the second bearer configuration information includes a mapping relationship between at least one third radio bearer and at least one fourth radio bearer, and configurations of a radio link control entity and a logical channel that are corresponding to the at least one third radio bearer. The third bearer configuration information includes configurations of a radio link control entity and a logical channel that are corresponding to the at least one fourth radio bearer. The third radio bearer is a radio bearer used for transmitting the data and the signaling of the first user equipment on the communication link between the second user equipment and the first user equipment, and the fourth radio bearer is a radio bearer used for transmitting the data and the signaling of the first user equipment on the communication link between the second user equipment and the second network device.

Content included in the second bearer configuration information and content included in the third bearer configuration information are described, and the second user equipment may perform configuration based on the second bearer configuration information or based on the second bearer configuration information and the third bearer configuration information. This is equivalent to that the network device provides a radio bearer configuration for the user equipment. The network device may configure a radio bearer for the eRelay UE based on QoS requirements of services of the eRemote UE and the eRelay UE, thereby helping ensure service QoS of the eRemote UE.

With reference to the first possible implementation of the second aspect, in a second possible implementation of the second aspect, the configuring, by the second user equipment, a radio bearer of a communication link between the second user equipment and the first user equipment based on the identifier of the first user equipment and the second bearer configuration information and/or the second indication information, and configuring, based on the identifier of the first user equipment and the third bearer configuration information, a radio bearer used for transmitting data and signaling of the first user equipment on a communication link between the second user equipment and the second network device includes: if the fourth message includes the second indication information, enabling, by the second user equipment, a first adaptation layer used for processing data that is transmitted between the first user equipment and the second network device; if the fourth message includes the second bearer configuration information, establishing, by the second user equipment, the radio link control entity and the logical channel that are corresponding to the at least one third radio bearer; and re-establishing or reconfiguring, by the second user equipment, the radio link control entity and the logical channel that are corresponding to the at least one fourth radio bearer, and enabling a second adaptation layer used for processing data transmitted on the fourth radio bearer.

The second user equipment may perform corresponding processing based on information included in the fourth message, so that the first user equipment can smoothly complete the communication path switching.

With reference to the second aspect or the first possible implementation or the second possible implementation of the second aspect, in a third possible implementation of the second aspect, the method further includes: sending, by the second user equipment, a cell identity of a serving cell of the second user equipment and an identifier of the second user equipment to the first user equipment in a discovery process between the second user equipment and the first user equipment; or sending, by the second user equipment, a cell identity of a serving cell of the second user equipment and an identifier of the second user equipment to the first user equipment in a process of establishing a communication connection to the first user equipment; or sending, by the second user equipment, a cell identity of a serving cell of the second user equipment and an identifier of the second user equipment to the first user equipment after establishing a communication connection to the first user equipment.

The second user equipment may send the cell identity of the serving cell of the second user equipment and the identifier of the second user equipment to the first user equipment flexibly by selecting different timings.

With reference to the second aspect or the first possible implementation, the second possible implementation, or third possible implementation of the second aspect, in a fourth possible implementation of the second aspect, the method further includes: obtaining, by the second user equipment, the identifier of the first user equipment; and sending, by the second user equipment, a fifth message to the network device, where the fifth message carries at least one of the identifier of the first user equipment and the identifier of the second user equipment.

Even if data is forwarded by using an adaptation layer but not an IP layer, in a manner provided in this embodiment of the present invention, the network device can determine the second user equipment and/or the first user equipment based on the equipment identifiers/equipment identifier, so that the network device may configure radio bearers/a radio bearer for the second user equipment and/or the first user equipment, or the network device may subsequently send downlink data to the second user equipment and/or the first user equipment.

According to a third aspect, a communication path switching method is provided. The method is executed by a first network device. The method includes: receiving, by the first network device, a first message sent by first user equipment, where the first message is used to request to switch a communication path between the first user equipment and the first network device from a direct path to an indirect path used for communicating with a second network device by using second user equipment; and sending, by the first network device, a second message to the first user equipment, where the second message carries first indication information used to instruct the first user equipment to perform the communication path switching; where the first message includes at least one of a cell identity of a serving cell of the second user equipment, an identifier of the second user equipment, an identifier of the first user equipment, and a communication technology used by a communication link between the first user equipment and the second user equipment; and the first network device and the second network device are a same network device or different network devices.

In this embodiment of the present invention, if the first user equipment requests to perform path switching, the first network device sends the second message to the first user equipment, to instruct the first user equipment to switch the communication path from the direct path to the indirect path. In other words, the first user equipment does not autonomously determine when to perform the switching; instead, the first network device indicates to the first user equipment when to perform the path switching. Therefore, the first network device may perform scheduling based on a service, to ensure service continuity as far as possible before and after the first user equipment performs the path switching.

In addition, the first message further includes at least one of the cell identity of the serving cell of the second user equipment, the identifier of the second user equipment, and the identifier of the first user equipment. Even if data is forwarded by using an adaptation layer but not an IP layer, in a manner provided in this embodiment of the present invention, the first network device can determine the second user equipment and/or the first user equipment, so that the first network device may configure radio bearers/a radio bearer for the second user equipment and/or the first user equipment, or the first network device may subsequently send downlink data to the second user equipment and/or the first user equipment.

With reference to the third aspect, in a first possible implementation of the third aspect, the second message further carries first bearer configuration information; and the first bearer configuration information includes a mapping relationship between at least one first radio bearer and at least one second radio bearer, and configurations of a radio link control entity and a logical channel that are corresponding to the at least one first radio bearer. The first radio bearer is a radio bearer used for the communication link between the first user equipment and the second user equipment; and the second radio bearer is a radio bearer used for a communication link between the second user equipment and the second network device.

Content included in the first bearer configuration information is described, and the first user equipment may perform configuration based on the first bearer configuration information. This is equivalent to that the first network device provides a radio bearer configuration for the user equipment. The first network device may configure, for eRemote UE, a radio bearer between the eRemote UE and eRelay UE based on a QoS requirement of a service of the eRemote UE, thereby helping ensure service QoS of the eRemote UE.

With reference to the third aspect or the first possible implementation of the third aspect, in a second possible implementation of the third aspect, after the receiving, by the first network device, a first message sent by first user equipment, the method further includes: sending, by the first network device, a fourth message to the second user equipment, where the fourth message carries second bearer configuration information and/or second indication information that is used to instruct the second user equipment to provide the first user equipment with indirect-path support, and the second bearer configuration information is used by the second user equipment to configure a radio bearer.

To be specific, if the first user equipment requests to perform path switching, the network device sends the fourth message to the second user equipment, to instruct the second user equipment to provide the first user equipment with indirect-path support. In other words, the first user equipment does not autonomously determine when to perform the switching; instead, the network device indicates to the first user equipment and the second user equipment when to perform the path switching. Therefore, the network device may perform scheduling based on a service, to ensure service continuity as far as possible before and after the first user equipment performs the path switching. In addition, the network device sends the bearer configuration information to the second user equipment. To be specific, the network device configures a radio bearer for the second user equipment, to ensure QoS of the first user equipment and second user equipment.

With reference to the second possible implementation of the third aspect, in a third possible implementation of the third aspect, the second bearer configuration information includes a mapping relationship between at least one third radio bearer and at least one fourth radio bearer, configurations of a radio link control entity and a logical channel that are corresponding to the at least one third radio bearer, and configurations of a radio link control entity and a logical channel that are corresponding to the at least one fourth radio bearer. The third radio bearer is a radio bearer used for the communication link between the second user equipment and the first user equipment, and the fourth radio bearer is a radio bearer used for the communication link between the second user equipment and the second network device.

With reference to the first possible implementation of the third aspect, in a fourth possible implementation of the third aspect, the first network device and the second network device are different network devices. Then, before the sending, by the first network device, a second message to the first user equipment, the method further includes: if the cell identity of the serving cell of the second user equipment that is carried in the first message indicates that the serving cell is a cell deployed on the second network device, sending, by the first network device, a sixth message to the second network device, where the sixth message is used to request to hand over the first user equipment from the first network device to the second network device; and receiving, by the first network device, a seventh message sent by the second network device, where the seventh message carriers the first bearer configuration information. The sixth message carries information carried in the first message.

In other words, if the network device in the direct path and the network device in the indirect path are different network devices, the first network device requests the second network device to hand over the first user equipment from the first network device to the second network device, so as to smoothly complete the communication path switching.

According to a fourth aspect, user equipment is provided. The user equipment includes a transmitter, a receiver, and a processor. The transmitter is configured to send a first message to a first network device, where the first message is used to request to switch a communication path between the user equipment and the first network device from a direct path to an indirect path used for communicating with a second network device by using the second user equipment; and the first message includes at least one of a cell identity of a serving cell of the second user equipment, an identifier of the second user equipment, an identifier of the user equipment, and a communication technology used by a communication link between the user equipment and the second user equipment; and the first network device and the second network device are a same network device or different network devices. The receiver is configured to receive a second message sent by the first network device, where the second message carries at least one of first bearer configuration information and first indication information that is used to instruct the user equipment to perform the communication path switching. The processor is configured to perform the communication path switching based on the first indication information.

With reference to the fourth aspect, in a first possible implementation of the fourth aspect, the first bearer configuration information includes a mapping relationship between at least one first radio bearer and at least one second radio bearer, and configurations of a radio link control entity and a logical channel that are corresponding to the at least one first radio bearer. The first radio bearer is a radio bearer used for the communication link between the user equipment and the second user equipment; and the second radio bearer is a radio bearer used for a communication link between the second user equipment and the second network device.

With reference to the first possible implementation of the fourth aspect, in a second possible implementation of the fourth aspect, the processor is further configured to: after the receiver receives the second message sent by the first network device, if the second message includes the first indication information, enable an adaptation layer used for processing data that is transmitted between the user equipment and the second network device by using the second user equipment; and if the second message includes the first bearer configuration information, reconfigure the radio link control entity and the logical channel of the first radio bearer based on the first bearer configuration information.

With reference to the fourth aspect or the first or the second possible implementation of the fourth aspect, in a third possible implementation of the fourth aspect, the processor is further configured to: before the transmitter sends the first message to the first network device, establish a communication connection to the second user equipment.

With reference to the fourth aspect or the first or the second possible implementation of the fourth aspect, in a fourth possible implementation of the fourth aspect, the processor is further configured to: after the receiver receives the second message sent by the first network device, establish a communication connection to the second user equipment.

With reference to any one of the fourth aspect or the first possible implementation to the fourth possible implementation of the fourth aspect, in a fifth possible implementation of the fourth aspect, the second network device and the first network device are a same network device. Then, the processor is further configured to: after the receiver receives the second message sent by the first network device, continue data communication with the first network device by using the direct path; and establish the communication connection to the second user equipment. The transmitter is further configured to send a third message to the first network device by using the second user equipment, where the third message is used to indicate that a process of the communication path switching has been completed. The processor is further configured to disconnect the direct path from the first network device.

With reference to any one of the fourth aspect or the first possible implementation to the fourth possible implementation of the fourth aspect, in a sixth possible implementation of the fourth aspect, the second network device and the first network device are different network devices, and the second message includes information used to instruct the user equipment to hand over to the second network device. Then, the processor is further configured to: after the receiver receives the second message sent by the first network device, continue data communication with the first network device by using the direct path; and establish the communication connection to the second user equipment. The transmitter is further configured to send a third message to the second network device by using the second user equipment, where the third message is used to indicate that a process of the communication path switching has been completed. The processor is further configured to disconnect the direct path from the first network device.

With reference to any one of the fourth aspect or the first possible implementation to the fourth possible implementation of the fourth aspect, in a seventh possible implementation of the fourth aspect, the second network device and the first network device are different network devices, and the second message includes information used to instruct the user equipment to hand over to the second network device. Then, the processor is further configured to: after the receiver receives the second message sent by the first network device, hand over from the first network device to the second network device based on an indication of the second message; and establish the communication connection to the second user equipment. The transmitter is further configured to send a third message to the second network device by using the second user equipment, where the third message is used to indicate that a process of the communication path switching has been completed.

With reference to any one of the fourth aspect or the first possible implementation to the seventh possible implementation of the fourth aspect, in an eighth possible implementation of the fourth aspect, the processor is further configured to: obtain the cell identity of the serving cell of the second user equipment and the identifier of the second user equipment in a discovery process between the user equipment and the second user equipment; or obtain the cell identity of the serving cell of the second user equipment and the identifier of the second user equipment in a process of establishing the communication connection to the second user equipment; or obtain the cell identity of the serving cell of the second user equipment and the identifier of the second user equipment after establishing the communication connection to the second user equipment.

According to a fifth aspect, user equipment is provided. The user equipment includes a receiver and a processor. The receiver is configured to receive a fourth message sent by a second network device, where the fourth message carries third bearer configuration information, an identifier of first user equipment, and second bearer configuration information and/or second indication information that is used to instruct the user equipment to provide the first user equipment with indirect-path support. The processor is configured to configure a radio bearer of a communication link between the user equipment and the first user equipment based on the identifier of the first user equipment and the second bearer configuration information and/or the second indication information, and configure, based on the identifier of the first user equipment and the third bearer configuration information, a radio bearer used for transmitting data and signaling of the first user equipment on a communication link between the user equipment and the second network device.

With reference to the fifth aspect, in a first possible implementation of the fifth aspect, the second bearer configuration information includes a mapping relationship between at least one third radio bearer and at least one fourth radio bearer, and configurations of a radio link control entity and a logical channel that are corresponding to the at least one third radio bearer. The third bearer configuration information includes configurations of a radio link control entity and a logical channel that are corresponding to the at least one fourth radio bearer. The third radio bearer is a radio bearer used for transmitting the data and the signaling of the first user equipment on the communication link between the user equipment and the first user equipment, and the fourth radio bearer is a radio bearer used for transmitting the data and the signaling of the first user equipment on the communication link between the user equipment and the second network device.

With reference to the first possible implementation of the fifth aspect, in a second possible implementation of the fifth aspect, that the processor configures a radio bearer of a communication link between the user equipment and the first user equipment based on the identifier of the first user equipment and the second bearer configuration information and/or the second indication information, and configures, based on the identifier of the first user equipment and the third bearer configuration information, a radio bearer used for transmitting data and signaling of the first user equipment on a communication link between the user equipment and the second network device includes: if the fourth message includes the second indication information, enabling a first adaptation layer used for processing data that is transmitted between the first user equipment and the second network device; if the fourth message includes the second bearer configuration information, establishing the radio link control entity and the logical channel that are corresponding to the at least one third radio bearer; and re-establishing or reconfiguring the radio link control entity and the logical channel that are corresponding to the at least one fourth radio bearer, and enabling a second adaptation layer used for processing data transmitted on the fourth radio bearer.

With reference to the fifth aspect or the first possible implementation or the second possible implementation of the fifth aspect, in a third possible implementation of the fifth aspect, the user equipment further includes a transmitter. The transmitter is configured to send a cell identity of a serving cell of the user equipment and an identifier of the user equipment to the first user equipment in a discovery process between the user equipment and the first user equipment; or send a cell identity of a serving cell of the user equipment and an identifier of the user equipment to the first user equipment in a process of establishing a communication connection to the first user equipment; or send a cell identity of a serving cell of the user equipment and an identifier of the user equipment to the first user equipment after establishing a communication connection to the first user equipment.

With reference to any one of the fifth aspect or the first possible implementation to the third possible implementation of the fifth aspect, in a fourth possible implementation of the fifth aspect, the user equipment further includes the transmitter. The processor is further configured to obtain the identifier of the first user equipment. The transmitter is configured to send a fifth message to the network device, where the fifth message carries at least one of the identifier of the first user equipment and the identifier of the user equipment.

According to a sixth aspect, a network device is provided. The network device includes a receiver and a transmitter. The transmitter is configured to receive a first message sent by first user equipment, where the first message is used to request to switch a communication path between the first user equipment and the network device from a direct path to an indirect path used for communicating with a second network device by using second user equipment. The first message includes at least one of a cell identity of a serving cell of the second user equipment, an identifier of the second user equipment, an identifier of the first user equipment, and a communication technology used by a communication link between the first user equipment and the second user equipment; and the network device and the second network device are a same network device or different network devices. The transmitter is configured to send a second message to the first user equipment, where the second message carries first indication information used to instruct the first user equipment to perform the communication path switching.

With reference to the sixth aspect, in a first possible implementation of the sixth aspect, the second message further carries first bearer configuration information; and the first bearer configuration information includes a mapping relationship between at least one first radio bearer and at least one second radio bearer, and configurations of a radio link control entity and a logical channel that are corresponding to the at least one first radio bearer. The first radio bearer is a radio bearer used for the communication link between the first user equipment and the second user equipment; and the second radio bearer is a radio bearer used for a communication link between the second user equipment and the second network device.

With reference to the sixth aspect or the first possible implementation of the sixth aspect, in a second possible implementation of the sixth aspect, the transmitter is further configured to, after the receiver receives the first message sent by the first user equipment, send a fourth message to the second user equipment, where the fourth message carries second bearer configuration information and/or second indication information that is used to instruct the second user equipment to provide the first user equipment with indirect-path support, and the second bearer configuration information is used by the second user equipment to configure a radio bearer.

With reference to the second possible implementation of the sixth aspect, in a third possible implementation of the sixth aspect, the second bearer configuration information includes a mapping relationship between at least one third radio bearer and at least one fourth radio bearer, configurations of a radio link control entity and a logical channel that are corresponding to the at least one third radio bearer, and configurations of a radio link control entity and a logical channel that are corresponding to the at least one fourth radio bearer. The third radio bearer is a radio bearer used for the communication link between the second user equipment and the first user equipment, and the fourth radio bearer is a radio bearer used for the communication link between the second user equipment and the second network device.

With reference to the first possible implementation of the sixth aspect, in a fourth possible implementation of the sixth aspect, the network device and the second network device are different network devices. Then, the transmitter is further configured to: before sending the second message to the first user equipment, if the cell identity of the serving cell of the second user equipment that is carried in the first message indicates that the serving cell is a cell deployed on the second network device, send a sixth message to the second network device, where the sixth message is used to request to hand over the first user equipment from the network device to the second network device, and the sixth message carries information carried in the first message. The receiver is further configured to receive a seventh message sent by the second network device, where the seventh message carries the first bearer configuration information.

According to a seventh aspect, user equipment is provided, where the user equipment includes a functional unit for executing the method according to any one of the first aspect or the possible implementations of the first aspect.

According to an eighth aspect, user equipment is provided, where the user equipment includes a functional unit for executing the method according to any one of the second aspect or the possible implementations of the second aspect.

According to a ninth aspect, a network device is provided, where the network device includes a functional unit for executing the method according to any one of the third aspect or the possible implementations of the third aspect.

According to a tenth aspect, a computer storage medium is provided, configured to store a computer software instruction used by the foregoing user equipment, and the computer software instruction includes a program designed for the user equipment for executing any one of the first aspect or the possible implementations of the first aspect.

According to an eleventh aspect, a computer storage medium is provided, configured to store a computer software instruction used by the foregoing user equipment, and the computer software instruction includes a program designed for the user equipment for executing any one of the second aspect or the possible implementations of the second aspect.

According to a twelfth aspect, a computer storage medium is provided, configured to store a computer software instruction used by the foregoing network device, and the computer software instruction includes a program designed for the network device for executing any one of the third aspect or the possible implementations of the third aspect.

In the embodiments of the present invention, the user equipment does not autonomously determine when to perform the switching; instead, the network device indicates to the user equipment when to perform the path switching. Therefore, the network device may perform scheduling based on a service, to ensure service continuity as far as possible before and after the user equipment performs the path switching.

DETAILED DESCRIPTION OF ILLUSTRATIVE EMBODIMENTS

Figure 1:
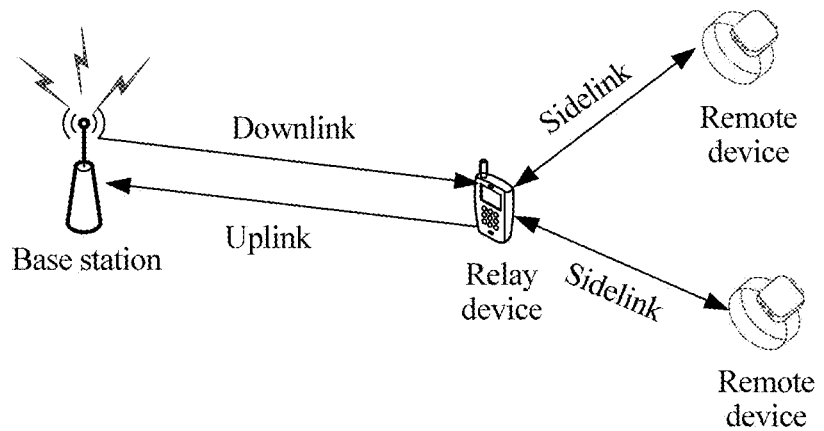
FIG. 1 is a schematic diagram of a network architecture on a radio access network side, in which remote UE is connected to a base station by using relay UE.

To make the purpose, technical solutions, and advantages of the embodiments of the present invention clearer, the following clearly and completely describes the technical solutions of the embodiments of the present invention with reference to the accompanying drawings in the embodiments of the present invention.

A technology described in this specification is not limited to an LTE system, and may also be used in a plurality of communications systems, such as a future 5G (5G) and other possible communications systems.

In the following, some terms of the embodiments of the present invention are described, so as to help a person skilled in the art have a better understanding.

(1) A user device may be a device that provides a user with voice and/or data connectivity, for example, may be a handheld device with a wireless connection function, or a processing device connected to a wireless modem. The user device may communicate with a core network by using a radio access network (Radio Access Network, RAN), and exchanges voice and/or data with the RAN. The user device may include user equipment (User Equipment, UE), a wireless terminal device, a mobile terminal device, a subscriber unit (Subscriber Unit), a subscriber station (Subscriber Station), a mobile station (Mobile Station), a mobile console (Mobile), a remote station (Remote Station), an access point (Access Point, AP), a remote terminal device (Remote Terminal), an access terminal device (Access Terminal), a user terminal device (User Terminal), a user agent (User Agent), a user device (User Device), and the like. For example, the user device may be a mobile phone (or referred to as a "cellular" phone), or a computer having a mobile terminal device, or a portable, pocket-sized, handheld, computer built-in, or in-vehicle mobile apparatus, or a smart wearable device. For example, it may be a device such as a personal communications service (Personal Communication Service, PCS) phone, a cordless telephone set, a session initiation protocol (SIP) phone, a wireless local loop (Wireless Local Loop, WLL) station, or a personal digital assistant (Personal Digital Assistant, PDA), a smartwatch, a smart helmet, smart glasses, or a smart band.

Users in the embodiments of the present invention mainly include first user equipment and second user equipment. The first user equipment is, for example, eRemote UE, and the second user equipment is, for example, eRelay UE. The eRelay UE can provide a relay service for the eRemote UE, so that the eRemote UE communicates with a base station by using the eRelay UE. The eRemote UE and the eRelay UE each may be implemented by using any of the foregoing user devices.

The eRemote UE and the base station may connect to each other by using a Uu interface. The eRemote UE and the eRelay UE may connect to each other by using a sidelink (Sidelink) technology, and in this case, an interface between the eRemote UE and the eRelay UE is a PC5 interface. Alternatively, the eRemote UE and the eRelay UE may connect to each other by using a non-3GPP (non-3GPP) access technology, for example, a Bluetooth (Bluetooth) access technology or a wireless local area network (Wireless Local Area Networks, WLAN) access technology.

If the eRemote UE directly communicates with the base station without using the eRelay UE, a path between the eRemote UE and the base station is referred to as a cellular path or a direct path, and a link between the eRemote UE and the base station is referred to as a cellular link, a direct link, or a Uu link. If the eRemote UE communicates with the base station by using the eRelay UE, a path between the eRemote UE and the base station is referred to as an indirect path or a relay path, and a link between the eRemote UE and the base station is referred to as an indirect link or a relay link.

(2) A network device, for example, including a base station (for example, an access point), may be a device that is in an access network and that communicates with a wireless terminal device over an air interface by using one or more sectors. The base station may be configured to mutually convert a received over-the-air frame and an IP packet and serve as a router between a user device and a remaining portion of the access network, where the remaining portion of the access network may include an IP network. The base station may coordinate attribute management of the air interface. For example, the base station may include an evolved NodeB (NodeB or eNB or e-NodeB, evolutional Node B) in an LTE system or an advanced LTE system (LTE-Advanced, LTE-A), or may include a next generation node B (next generation node B, NG-NB) in a 5G system. This is not limited in the embodiments of the present invention.

(3) The terms "system" and "network" may be used interchangeably in the embodiments of the present invention. The term "a plurality of" means two or more than two. In view of this, the term "a plurality of" may also be understood as "at least two" in the embodiments of the present invention. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless otherwise specified.

The following first describes a technical background of the embodiments of the present invention.

Currently, one user equipment may connect to a base station in two connection modes.

Connection mode 1: The user equipment directly connects to the base station for communication. This manner may be referred to as direct communication.

Connection mode 2: The user equipment connects to the base station by using another user equipment for communication. This manner may be referred to as indirect communication. In this case, the former user equipment is remote UE, and may be referred to as remote user equipment or a remote device, and the terminal device used for connecting the base station and the remote device is relay UE, and may be referred to as relay user equipment or a relay device.

FIG. 1 shows a network architecture on a radio access network side, in which remote UE is connected to a base station by using relay UE. It can be seen from FIG. 1 that, an uplink and a downlink may be established between the base station and the relay device. One relay device may connect to a plurality of remote devices. In FIG. 1, two remote devices are used as an example. A link between the relay device and the remote device may be referred to as a relay link or a sidelink.

Figure 2A:
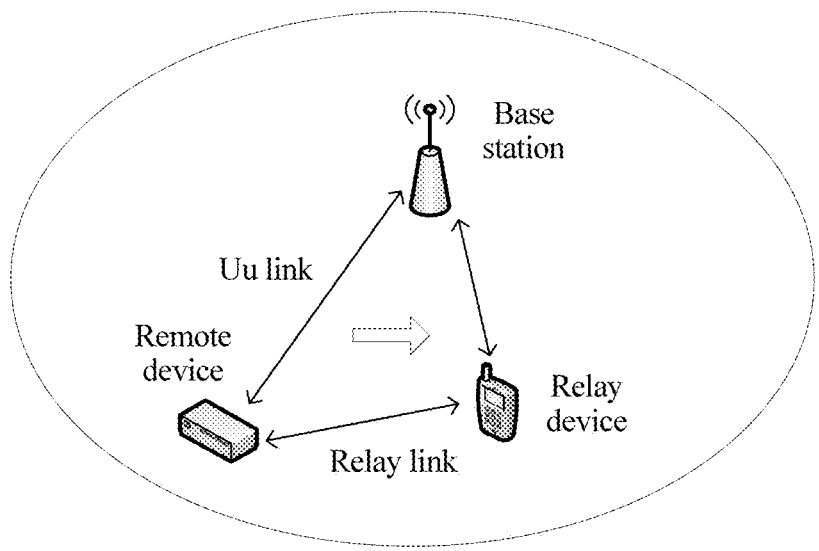
FIG. 2A is a schematic diagram of a process of switching remote UE and relay UE from a direct communication manner to an indirect communication manner.
Figure 2B:
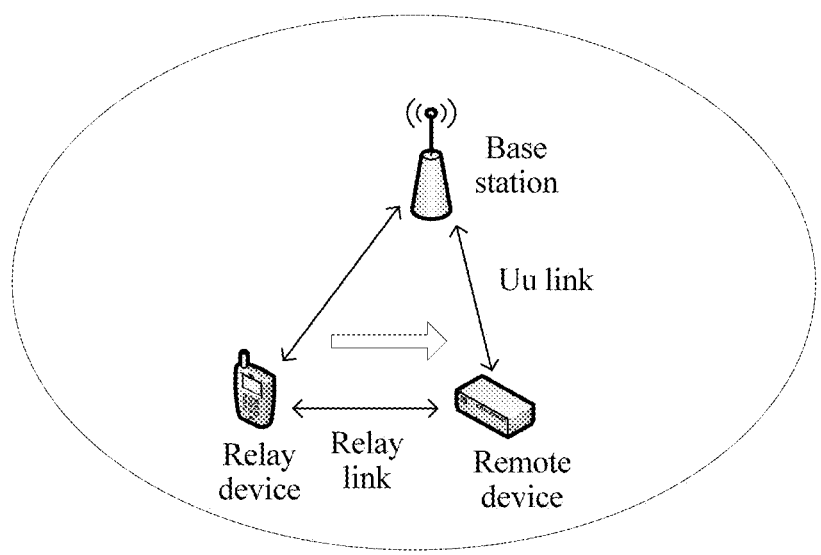
FIG. 2B is a schematic diagram of a process of switching remote UE and relay UE from an indirect communication manner to a direct communication manner.

The remote UE may switch between the two connection modes or communication paths. For example, when quality of a link between one UE and a base station is relatively poor, the UE may be used as remote UE, and one relay UE nearby may be selected and used to connect to the base station. In this case, a direct connection manner needs to be switched to an indirect communication manner, to be specific, a Uu link needs to be switched to a relay link, as shown in FIG. 2A. For another example, when relay UE connected to remote UE moves, it is possible that a connection between the remote UE and the relay UE cannot be maintained. In this case, an indirect communication manner needs to be switched to a direct communication manner, to be specific, a relay link needs to be switched to a Uu link, as shown in FIG. 2B.

Figure 3:
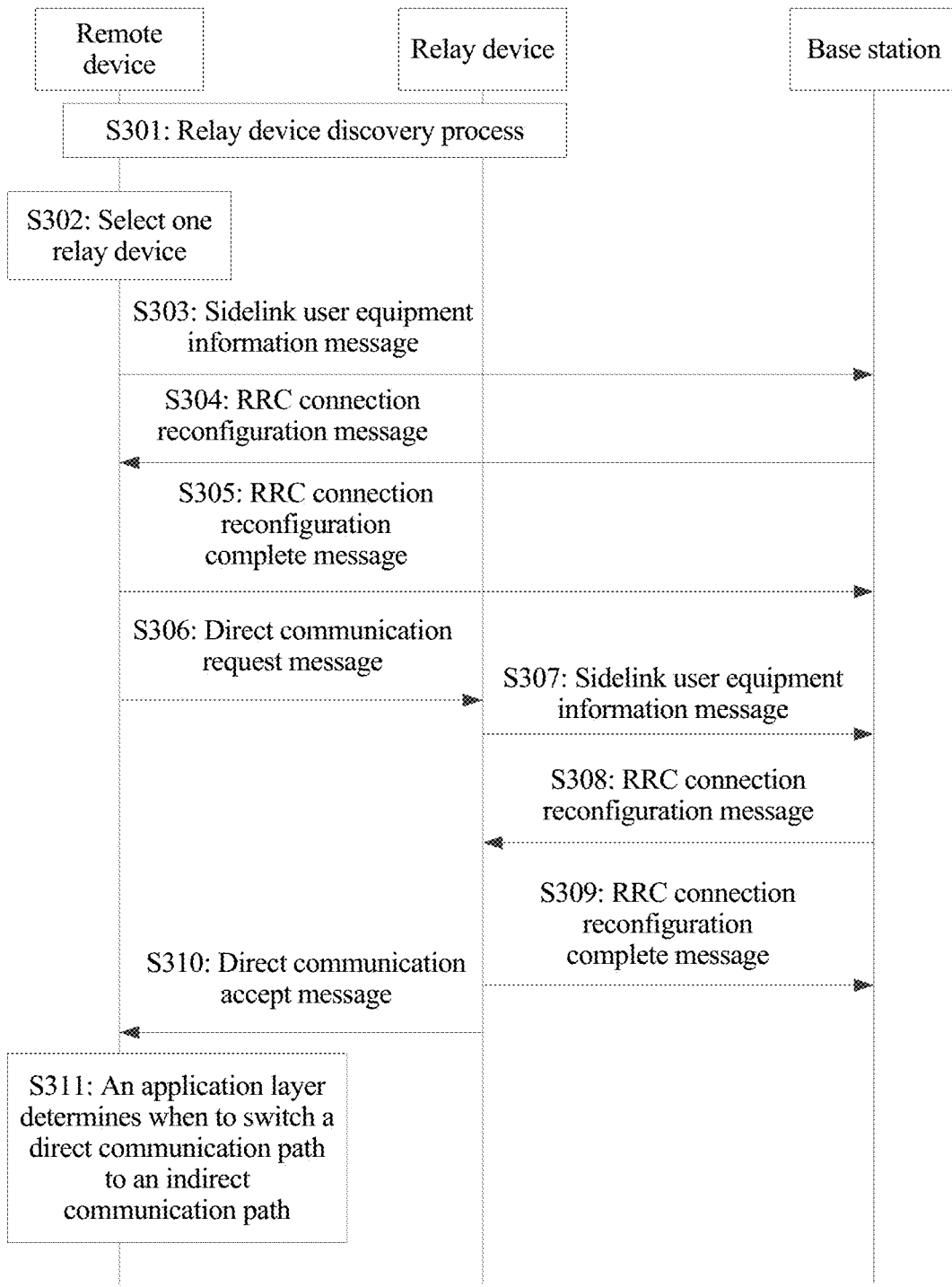
FIG. 3 is a flowchart of path switching of remote UE from a cellular link to a relay link in a layer 3 relay architecture.

In the Rel-13, standardized relay UE forwards data between remote UE and a base station by using an IP layer, namely, a layer 3. The following describes a path switching process in which the remote UE is switched from a cellular link to a relay link in a layer 3 relay architecture, as shown in FIG. 3. A base station of the remote UE may be the same as or different from a base station of the relay UE. This does not affect the solutions. In FIG. 3, that the two base stations are a same base station is used as an example.

First, the remote UE is directly connected to the base station by using a Uu interface, and performs data communication in a direct communication manner.

S301: If the remote UE determines that channel quality of a Uu link is less than a threshold configured by the base station, the remote UE triggers a path switching process. The remote UE first triggers a relay UE discovery process. This process may also be considered as a process in which the remote UE and the relay UE discover each other.

For example, if the remote UE sends a broadcast message, relay UE that receives this broadcast message may return a response to the remote UE, and the remote UE determines that the relay UE is discovered. Alternatively, relay UE proactively sends a broadcast message. If the remote UE receives this broadcast message, the remote UE determines that the relay UE is discovered.

S302: If the remote UE discovers one or more relay UEs that meet a condition, the remote UE selects one from the relay UEs.

S303: The remote UE starts to establish a connection to the selected relay UE. The remote UE first sends a sidelink user equipment information (Sidelink UE Information) message to the base station, where the message is used to notify the base station that the remote UE needs to communicate with the relay UE, and request for a resource for communicating with the relay UE from the base station. Then, the base station receives the Sidelink UE Information message.

S304: The base station sends a radio resource control connection reconfiguration (RRC Connection Reconfiguration) message to the remote UE, to configure, for the remote UE, a resource allocation manner used for the communication between the remote UE and the relay UE. Then, the remote UE receives the RRC Connection Reconfiguration message.

If the resource allocation manner configured by the base station for the remote UE is a resource allocation manner of UE autonomous resource selection (UE autonomous resource selection), the base station includes, in the RRC Connection Reconfiguration message, a resource pool allocated to the remote UE.

S305: The remote UE performs configuration based on content in the RRC Connection Reconfiguration message. Subsequently, the remote UE sends a radio resource control connection reconfiguration complete (RRC Connection Reconfiguration Complete) message to the base station. Then, the base station receives the RRC Connection Reconfiguration Complete message.

S306: The remote UE sends a direct communication request (DIRECT_COMMUNICATION_REQUEST) message to the relay UE on a resource in the resource pool allocated by the base station or on a resource scheduled by the base station. Then, the relay UE receives the DIRECT_COMMUNICATION_REQUEST message on a resource in a resource pool allocated by the base station or on a resource scheduled by the base station.

S307: After receiving the DIRECT_COMMUNICATION_REQUEST message sent by the remote UE, the relay UE sends a Sidelink UE Information message to the base station, to notify the base station that the relay UE needs to communicate with the remote UE, and request a resource for communicating with the remote UE from the base station. Then, the base station receives the Sidelink UE Information message.

After the relay UE receives the DIRECT_COMMUNICATION_REQUEST message sent by the remote UE, if the relay UE is currently in a radio resource control idle (RRC_IDLE) state, the relay UE first enters an RRC connected (RRC_CONNECTED) state by using a radio resource control (Radio Resource Control, RRC) connection establishment process. Afterwards, the relay UE sends the Sidelink UE Information message to the base station.

S308: The base station sends an RRC Connection Reconfiguration message to the relay UE, to configure, for the relay UE, a resource allocation manner used for the communication between the relay UE and the remote UE. Then, the relay UE receives the RRC Connection Reconfiguration message.

If the resource allocation manner configured by the base station for the relay UE is a resource allocation manner of UE autonomous resource selection, the base station includes, in the RRC Connection Reconfiguration message, the resource pool allocated to the relay UE.

S309: The relay UE performs configuration based on content in the RRC Connection Reconfiguration message. Subsequently, the relay UE sends an RRC Connection Reconfiguration Complete message to the base station. Then, the base station receives the RRC Connection Reconfiguration Complete message.

S310: The relay UE sends a direct communication accept (DIRECT_COMMUNICATION_ACCEPT) message to the remote UE on a resource in the resource pool allocated by the base station or on a resource scheduled by the base station. Then, the remote UE receives the DIRECT_COMMUNICATION_ACCEPT message.

S311: After the remote UE receives the DIRECT_COMMUNICATION_ACCEPT message sent by the relay UE, an application layer of the remote UE determines when to switch from the Uu link (link) to a relay link, that is, switch from a direct communication path to an indirect communication path.

It can be seen that, according to the solution shown in FIG. 3, if the eRemote UE needs to perform path switching, for example, switch from the direct path between the eRemote UE and the base station to the indirect path used for communicating with the base station by using the eRelay UE, the application layer of the eRemote UE still autonomously determines when to switch data communication from the cellular link to the relay link, and service continuity before and after the path switching still cannot be ensured.

In view of this, in this embodiment of the present invention, if first user equipment requests to perform path switching, a network device sends a second message to the first user equipment, to instruct the first user equipment to switch a communication path from a direct path to an indirect path. In other words, the first user equipment does not autonomously determine when to perform the switching; instead, the network device indicates to the first user equipment when to perform the path switching. Therefore, the network device may perform scheduling based on a service, to ensure service continuity as far as possible before and after the first user equipment performs the path switching.

The following describes the technical solutions provided in the embodiments of the present invention with reference to accompanying drawings. A network relay manner of layer 2 UE-to-NW relay is used in the embodiments of the present invention. In the description below, that the first user equipment is eRemote UE, the second user equipment is eRelay UE, and the network device is a base station is used as an example. Certainly, actual application is not limited thereto.

Figure 4:
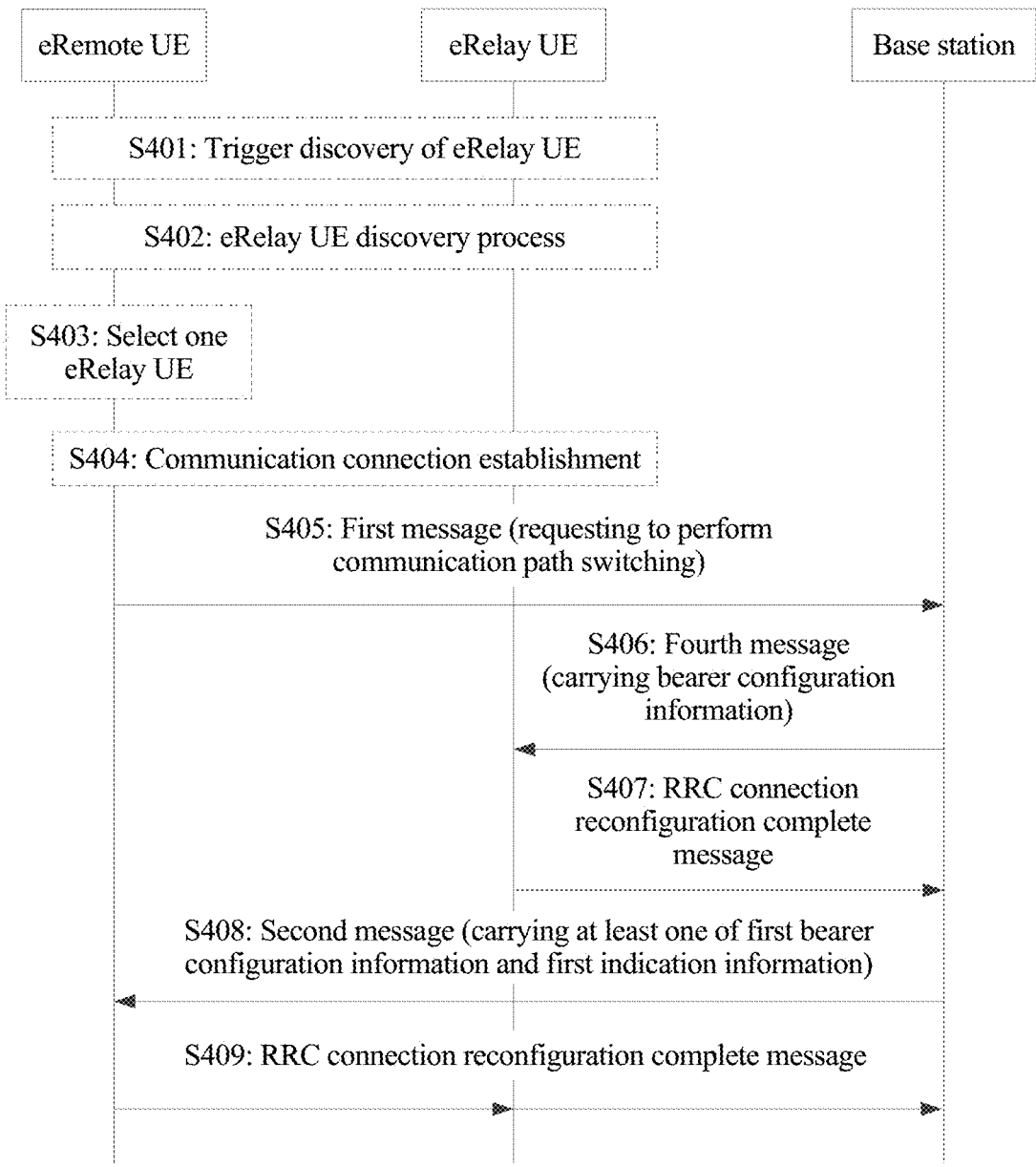
FIG. 4 is a flowchart of a communication path switching method according to an embodiment of the present invention.

Referring to FIG. 4, an embodiment of the present invention provides a communication path switching method. In this embodiment of the present invention, a base station in a direct path and a base station in an indirect path are a same base station. A process of the method is described as follows.

Initially, eRemote UE is directly connected to a base station, and performs data communication with the base station by using a direct path.

S401: When the eRemote UE meets a trigger condition of an eRelay UE discovery process, the eRemote UE triggers discovery of eRelay UE. The trigger condition is configured by the base station. Alternatively, the eRemote UE triggers discovery autonomously.

S402: The eRemote UE enters the eRelay UE discovery process, to discover eRelay UE nearby by using this discovery process.

S403: When the eRemote UE discovers one or more eRelay UEs that meet a condition, the eRemote UE selects one from the eRelay UEs that meet the condition.

S404: After selecting one eRelay UE, the eRemote UE establishes a communication connection to the eRelay UE, where the communication connection herein is a short-range link connection between the eRemote UE and the eRelay UE. A short-range link connection technology between the eRemote UE and the eRelay UE includes but is not limited to an LTE sidelink technology, a WLAN technology, and a Bluetooth technology.

When the short-range link connection technology between the eRemote UE and the eRelay UE is the LTE sidelink technology, before establishing the communication connection to the eRelay UE, the eRemote UE first needs to request a resource from the base station. After obtaining a resource allocated by the base station, the eRemote UE establishes the communication connection to the eRelay UE.

In addition, in this process, if an initial state of the eRelay UE is an RRC_IDLE state, the eRelay UE first enters an RRC_CONNECTED state by using an RRC connection establishment process, and then establishes the communication connection to the eRemote UE.

S401 to S404 are optional steps. To differentiate from mandatory steps, these steps are denoted by using dashed lines in FIG. 4.

S405: After successfully establishing the communication connection to the selected eRelay UE, the eRemote UE sends a first message to the base station, where the first message is used to request the base station to perform communication path switching, to be specific, request to switch a communication path between the eRemote UE and the base station from the direct path to an indirect path used for communicating with the base station by using the eRelay UE. Then, the base station receives the first message. A base station before the path switching, namely, the base station in the direct path and a base station after the path switching, namely, the base station in the indirect path, may be a same base station, or may be different base stations. In this embodiment of the present invention, that the two base stations are a same base station is used as an example. For example, the first message is an RRC message, and the RRC message carries at least one of the following information:

path switching type: path switching from a cellular path to a relay path;

an identifier of the eRelay UE that is selected by the eRemote UE and to which the eRemote UE establishes the communication connection;

a cell identity of a serving cell of the eRelay UE that is selected by the eRemote UE and to which the eRemote UE establishes the communication connection; and a short-range communications technology between the eRemote UE and the eRelay UE, for example, an LTE sidelink technology, a Bluetooth technology, or a WLAN technology.

S406: The base station sends a fourth message to the eRelay UE, where the fourth message carries third bearer configuration information and an identifier of the eRemote UE. In addition, the fourth message further carries second bearer configuration information and/or second indication information. The second indication information is used to instruct the eRelay UE to provide the eRemote UE with indirect-path support. The second bearer configuration information and the third bearer configuration information are used by the eRelay UE to configure radio bearers. Then, the eRelay UE receives the fourth message. For example, the fourth message is an RRC connection reconfiguration message. The RRC connection reconfiguration message is used to configure, for the eRelay UE, a radio bearer used for carrying control signaling and user-plane data of the eRemote UE.

The second bearer configuration information includes a mapping relationship between at least one third radio bearer and at least one fourth radio bearer, and configurations of a radio link control entity and a logical channel that are corresponding to the at least one third radio bearer. The third bearer configuration information includes configurations of a radio link control entity and a logical channel that are corresponding to the at least one fourth radio bearer. The foregoing uses an example in which the mapping relationship between at least one third radio bearer and at least one fourth radio bearer is included in the second bearer configuration information. Alternatively, the mapping relationship between at least one third radio bearer and at least one fourth radio bearer may be included in the third bearer configuration information, instead of the second bearer configuration information.

The third radio bearer is a radio bearer used for transmitting data and signaling of the eRemote UE on a communication link between the eRelay UE and the eRemote UE, and the fourth radio bearer is a radio bearer used for transmitting the data and the signaling of the eRemote UE on a communication link between the eRelay UE and the base station.

After receiving the first message, the base station determines, based on the cell identity of the serving cell of the eRelay UE that is included in the first message, that the serving cell of the eRelay UE belongs to the local base station or belongs to another adjacent base station. In this embodiment of the present invention, that the serving cell of the eRelay UE is a cell of the local base station is used as an example. Then, the base station determines, based on the identifier of the eRelay UE that is included in the first message, which UE is the eRelay UE connected to the eRemote UE. If the base station allows the eRemote UE to perform the communication path switching, the base station sends the RRC connection reconfiguration message to the eRelay UE.

S407: The eRelay UE configures the corresponding radio bearer based on the fourth message. After completing RRC connection reconfiguration, the eRelay UE sends an RRC connection reconfiguration complete message to the base station. Then, the base station receives the RRC connection reconfiguration complete message.

The eRelay UE configures a radio bearer of the communication link between the eRelay UE and the eRemote UE based on the identifier of the eRemote UE and the second bearer configuration information and/or the second indication information, and configures, based on the identifier of the eRemote UE and the third bearer configuration information, a radio bearer used for transmitting the data and the signaling of the eRemote UE on the communication link between the eRelay UE and the base station.

Specifically, if the fourth message includes the second indication information, the eRelay UE enables an adaptation layer used for processing data that is transmitted between the eRemote UE and the base station. For example, the adaptation layer is referred to as a first adaptation layer. If the fourth message includes the second bearer configuration information, the eRelay UE establishes the radio link control entity and the logical channel that are corresponding to the at least one third radio bearer. In addition, the eRelay UE reestablishes, based on the third bearer configuration information carried in the fourth message, the radio link control entity and the logical channel that are corresponding to the at least one fourth radio bearer, and enables an adaptation layer used for processing data transmitted on the fourth radio bearer. For example, the adaptation layer is referred to as a second adaptation layer. Alternatively, the eRelay UE reconfigures, based on the third bearer configuration information carried in the fourth message, the radio link control entity and the logical channel that are corresponding to the at least one fourth radio bearer, and enables a second adaptation layer used for processing data transmitted on the fourth radio bearer.

S408: If the base station allows the eRemote UE to perform the communication path switching, the base station sends a second message to the eRemote UE, where the second message carries at least one of first bearer configuration information and first indication information that is used to instruct the eRemote UE to perform the communication path switching. The second indication information is used to instruct the eRemote UE to perform the communication path switching, and the first bearer configuration information includes radio bearer configuration information of the link between the eRemote UE and the eRelay UE and/or configuration information of a PDCP layer between the eRemote UE and the base station. Then, the eRemote UE receives the second message. For example, the second message is an RRC connection reconfiguration message.

Specifically, the first bearer configuration information includes a mapping relationship between at least one first radio bearer and at least one second radio bearer, and configurations of a radio link control entity and a logical channel that are corresponding to the at least one first radio bearer. The first radio bearer is a radio bearer used for the communication link between the eRemote UE and the eRelay UE, and the second radio bearer is a radio bearer used for the communication link between the eRemote UE and the base station.

S409: The eRemote UE configures a corresponding radio bearer based on the second message, and after completing RRC connection reconfiguration, the eRemote UE sends an RRC connection reconfiguration complete message to the base station by using the eRelay UE. Then, the base station receives the RRC connection reconfiguration complete message, and the eRemote UE stops data transmission performed between the eRemote UE and the base station by using the direct path, to be specific, disconnects the direct path from the base station. Afterwards, the eRemote UE starts data transmission with the base station by using the eRelay UE.

If the second message includes the first indication information, the eRemote UE enables an adaptation layer used for processing data that is transmitted between the eRemote UE and the base station by using the eRelay UE. For example, the adaptation layer is referred to as a third adaptation layer. If the second message includes the first bearer configuration information, the eRemote UE reconfigures the radio link control entity and the logical channel of the first radio bearer based on the first bearer configuration information.

An execution sequence of S406 to S409 may be random, and is not limited to a sequence provided in FIG. 4.

As described in S405, the first message may carry the cell identity of the serving cell of the eRelay UE. In this case, if the eRemote UE and the eRelay UE perform the communication connection by using a 3GPP technology, methods for obtaining the cell identity of the serving cell of the eRelay UE by the eRemote UE include but are not limited to the following several methods:

1. The eRemote UE obtains the cell identity of the serving cell of the eRelay UE in a process of establishing the communication connection to the eRelay UE. Details are as follows:

The eRemote UE includes, in a connection establishment request message to be sent to the eRelay UE, indication information used to request the eRelay UE to send the cell identity of the serving cell of the eRelay UE. Then, after receiving the connection establishment request message of the eRemote UE, the eRelay UE includes the cell identity of the serving cell of the eRelay UE in a connection request accept message to be returned to the eRemote UE. The cell identity of the serving cell may be directly included in the connection accept request message, or may be transmitted as a media access control (Media Access Control, MAC) control element (Control Element, CE) in a MAC protocol data unit (Protocol Data Unit, PDU) that carries the connection accept request message.

2. The eRelay UE proactively sends cell identification information of the serving cell of the eRelay UE. Details are as follows:

The eRelay UE proactively includes the cell identity of the serving cell of the eRelay UE in a connection request accept message to be returned to the eRemote UE. Similarly, the cell identity of the serving cell may be directly included in the connection accept request message, or may be transmitted as a MAC CE in a MAC PDU that carries the connection accept request message.

If the eRemote UE and the eRelay UE perform the communication connection by using a non-3GPP technology, methods for obtaining the cell identity of the serving cell of the eRelay UE by the eRemote UE include but are not limited to the following methods:

The eRemote UE sends a request message to the eRelay UE. The request message is used to request the eRelay UE to provide the eRemote UE with layer 2 UE-to-NW relay support, or request the eRelay UE to forward, for the eRemote UE, service data between the eRemote UE and the base station by using a layer 2. If the eRelay UE accepts a request of the request message, the eRelay UE returns a request accept message to the eRemote UE, to notify the eRemote UE that the eRelay UE has accepted the request of the eRemote UE. The eRelay UE includes the cell identity of the serving cell of the eRelay UE in this request accept message. The request message sent by the eRemote UE and the request accept message returned by the eRelay UE may be RRC messages. If the eRelay UE is in the RRC_IDLE state when receiving the request message sent by the eRemote UE, the eRelay UE first establishes an RRC connection, enters the RRC_CONNECTED state, and then returns the request accept message to the eRemote UE.

In this embodiment of the present invention, the cell identity may include a physical cell identifier (Physical Cell Identity, PCI) of a cell, or include a cell identity (Cell Identity) that can uniquely identify a cell in a public land mobile network (Public Land Mobile Network, PLMN), or include a cell global identity (Cell global identity, CGI) of a cell.

In addition, after the eRemote UE sends the first message to the base station, the base station may reject a path switching request of the eRemote UE. Then, because the eRemote UE has established the communication connection to the eRelay UE in advance, if the base station rejects the path switching request of the eRemote UE, the eRemote UE needs to know a decision of the base station, so as to release the communication connection to the eRelay UE in a timely manner. In this embodiment of the present invention, when the base station rejects the path switching request of the eRemote UE, solutions for the eRemote UE to release the communication connection to the eRelay UE include but are not limited to the following several solutions:

1. Solution 1:

If the base station rejects the communication path switching of the eRemote UE, the base station sends an RRC message to the eRemote UE, where the RRC message includes indication information indicating that the path switching of the eRemote UE is rejected. Then, the eRemote UE knows, based on the indication information carried in the RRC message, that the base station rejects the path switching request, and the eRemote UE may trigger a process of releasing the communication connection to the eRelay UE.

2. Solution 2:

The base station configures duration for the eRemote UE. The eRemote UE starts a timer after sending the first message to the base station. Timing duration of the timer is the duration configured by the base station. If the eRemote UE receives the second message during running of the timer, the eRemote UE stops the timer. If the eRemote UE receives no second message when the timer expires, the eRemote UE determines that the base station rejects the path switching request, and the eRemote UE triggers a process of releasing the communication connection to the eRelay UE.

3. Solution 3:

The eRemote UE starts a timer after sending the first message to the base station. Timing duration of the timer is determined by the eRemote UE, for example, determined by the eRemote UE according to experience. If the eRemote UE receives the second message during running of the timer, the eRemote UE stops the timer. If the eRemote UE receives no second message when the timer expires, the eRemote UE determines that the base station rejects the path switching request, and the eRemote UE triggers a process of releasing the communication connection to the eRelay UE.

Figure 5:
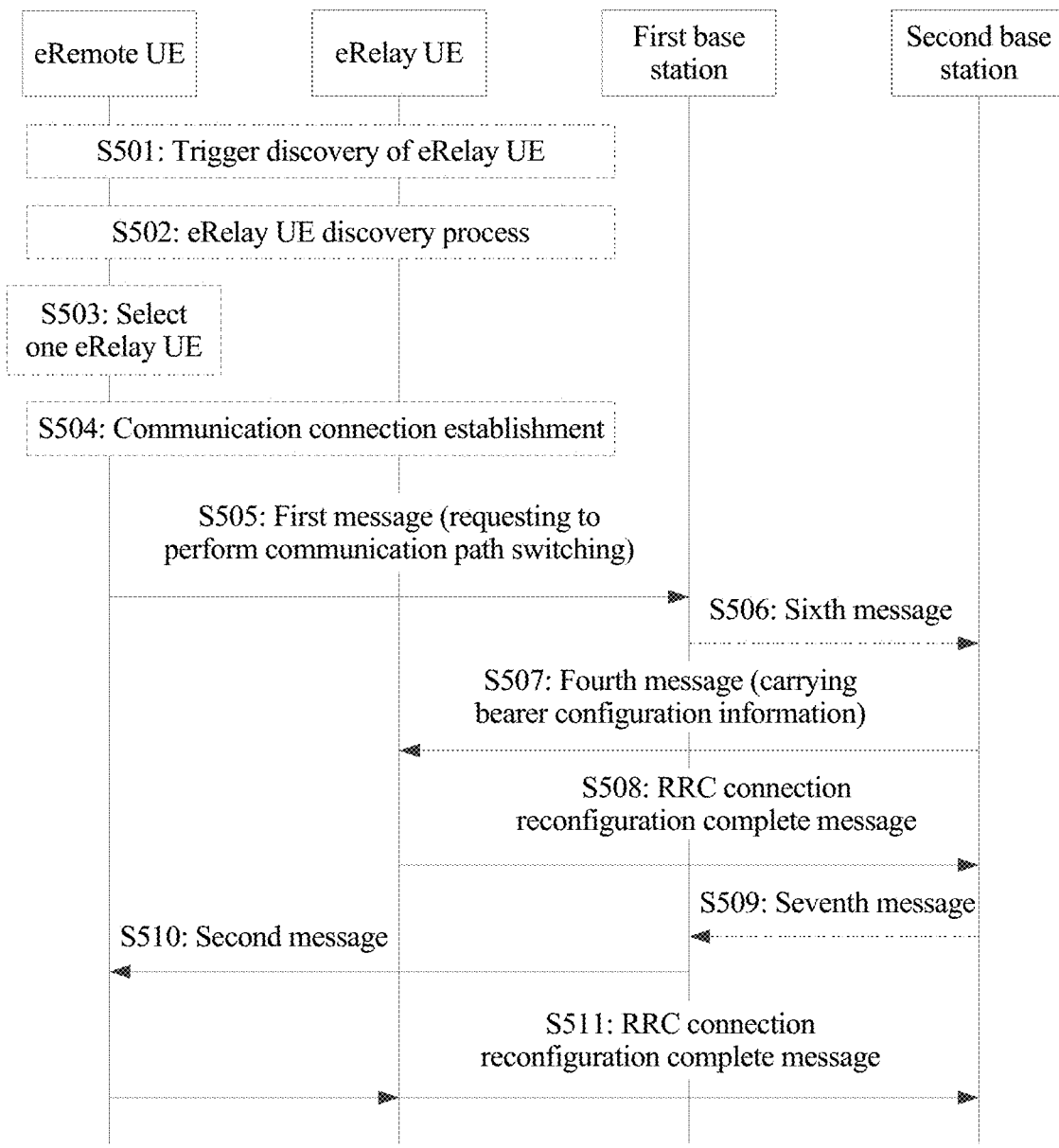
FIG. 5 is a flowchart of a communication path switching method according to an embodiment of the present invention.

Referring to FIG. 5, an embodiment of the present invention provides a communication path switching method. In this embodiment of the present invention, a base station in a direct path and a base station in an indirect path are different base stations. A process of the method is described as follows.

Initially, eRemote UE is directly connected to a base station, and performs data communication with the base station by using a direct path.

For S501 to S505 in this embodiment of the present invention, refer to S401 to S405 in the embodiment shown in FIG. 4. Same steps are not repeatedly described. The following mainly describes steps different from those in the embodiment shown in FIG. 4. A first base station in S501 to S505 is the base station in the embodiment shown in FIG. 4.

S506: The first base station sends a sixth message to a second base station, where the sixth message is used to request to hand over the eRemote UE from the first base station to the second base station, and the sixth message includes all information carried in the first message. For example, the sixth message is a handover request message. Then, the second base station receives the sixth message.

After receiving the first message, the base station determines, based on the cell identity of the serving cell of the eRelay UE that is included in the first message, that the serving cell of the eRelay UE belongs to the local base station or belongs to another adjacent base station. In this embodiment of the present invention, that the serving cell of the eRelay UE is a cell of another base station is used as an example. The another base station is referred to as the second base station, and the local base station is referred to as the first base station. Then, the first base station sends the sixth message to a serving base station of the eRelay UE, namely, the second base station. The sixth message includes all the information included by the eRemote UE in the first message. In addition, the first base station may further notify the second base station in the sixth message that a reason for a current handover is that the eRemote UE needs to perform communication path switching from the direct communication path to an indirect communication path.

S507: The second base station sends a fourth message to the eRelay UE, where the fourth message carries third bearer configuration information and an identifier of the eRemote UE. In addition, the fourth message further carries second bearer configuration information and/or second indication information. The second indication information is used to instruct the eRelay UE to provide the eRemote UE with indirect-path support. The second bearer configuration information and the third bearer configuration information are used by the eRelay UE to configure radio bearers. Then, the eRelay UE receives the fourth message. For example, the fourth message is an RRC connection reconfiguration message. The RRC connection reconfiguration message is used to configure, for the eRelay UE, a radio bearer used for carrying control signaling and user-plane data of the eRemote UE.

The second bearer configuration information includes a mapping relationship between at least one third radio bearer and at least one fourth radio bearer, and configurations of a radio link control entity and a logical channel that are corresponding to the at least one third radio bearer. The third bearer configuration information includes configurations of a radio link control entity and a logical channel that are corresponding to the at least one fourth radio bearer. The foregoing uses an example in which the mapping relationship between at least one third radio bearer and at least one fourth radio bearer is included in the second bearer configuration information. Alternatively, the mapping relationship between at least one third radio bearer and at least one fourth radio bearer may be included in the third bearer configuration information, instead of the second bearer configuration information.

The third radio bearer is a radio bearer used for transmitting data and signaling of the eRemote UE on a communication link between the eRelay UE and the eRemote UE, and the fourth radio bearer is a radio bearer used for transmitting the data and the signaling of the eRemote UE on a communication link between the eRelay UE and the base station.

After receiving the handover request message sent by the first base station, the second base station determines, based on the identifier of the eRelay UE that is carried in the handover request message, which UE is the eRelay UE connected to the eRemote UE. If the second base station allows the eRemote UE to perform the communication path switching and perform communication in an indirect-connection manner with the second base station by using the eRelay UE, the second base station sends the fourth message to the eRelay UE, where the fourth message is used to configure, for the eRelay UE, the radio bearer used for carrying the control signaling and the user-plane data of the eRemote UE. For example, the fourth message is an RRC connection reconfiguration message.

S508: The eRelay UE configures the corresponding radio bearer based on the fourth message. After completing RRC connection reconfiguration, the eRelay UE sends an RRC connection reconfiguration complete message to the second base station. Then, the second base station receives the RRC connection reconfiguration complete message.

The eRelay UE configures a radio bearer of the communication link between the eRelay UE and the eRemote UE based on the identifier of the eRemote UE and the second bearer configuration information and/or the second indication information, and configures, based on the identifier of the eRemote UE and the third bearer configuration information, a radio bearer used for transmitting the data and the signaling of the eRemote UE on the communication link between the eRelay UE and the base station.

Specifically, for details about how the eRelay UE performs configuration, refer to the description of S407 in the embodiment shown in FIG. 4. Details are not described again.

S509: After receiving the RRC connection reconfiguration complete message returned by the eRelay UE, the second base station sends a seventh message to the first base station. Then, the first base station receives the seventh message. The seventh message carries first bearer configuration information, that is, carries radio bearer configuration information of the link between the eRemote UE and the eRelay UE and/or configuration information of a PDCP layer between the eRemote UE and the base station. For example, the seventh message is a handover confirm message.

S506 and S509 are optional steps. To differentiate from mandatory steps, these two steps are denoted by using dashed lines in FIG. 5.

S510: After receiving the seventh message sent by the second base station, the first base station sends a second message to the eRemote UE, where the second message is used to instruct the eRemote UE to perform the communication path switching. The second message carries information carried in the seventh message. For example, the second message is an RRC connection reconfiguration message.

S511: After receiving the second message, the eRemote UE configures a corresponding radio bearer based on the second message, and after completing RRC connection reconfiguration, the eRemote UE sends an RRC connection reconfiguration complete message to the second base station by using the eRelay UE. Then, the second base station receives the RRC connection reconfiguration complete message, and the eRemote UE stops data transmission performed between the eRemote UE and the first base station by using the direct path, to be specific, disconnects the direct path from the base station. Afterwards, the eRemote UE starts data transmission with the second base station by using the eRelay UE.

If the second message includes first indication information, the eRemote UE enables a third adaptation layer used for processing data that is transmitted between the eRemote UE and the base station by using the eRelay UE. If the second message includes the first bearer configuration information, the eRemote UE reconfigures a radio link control entity and a logical channel of a first radio bearer based on the first bearer configuration information. For content included in the first bearer configuration information, refer to the description of S408 in the embodiment shown in FIG. 4. Details are not described again.

An execution sequence of S506 to S511 may be random, and is not limited to a sequence provided in FIG. 5.

For a manner in which the eRemote UE obtains the cell identity of the serving cell of the eRelay UE, refer to the description in the embodiment shown in FIG. 4.

After the eRemote UE sends the first message to the base station, the base station may reject a path switching request of the eRemote UE, and the eRemote UE needs to know a decision of the base station, so as to release the communication connection to the eRelay UE in a timely manner. For details about how the eRemote UE knows the decision of the base station and therefore releases the communication connection to the eRelay UE, refer to the related description in the embodiment shown in FIG. 4. Details are not described again.

Figure 6:
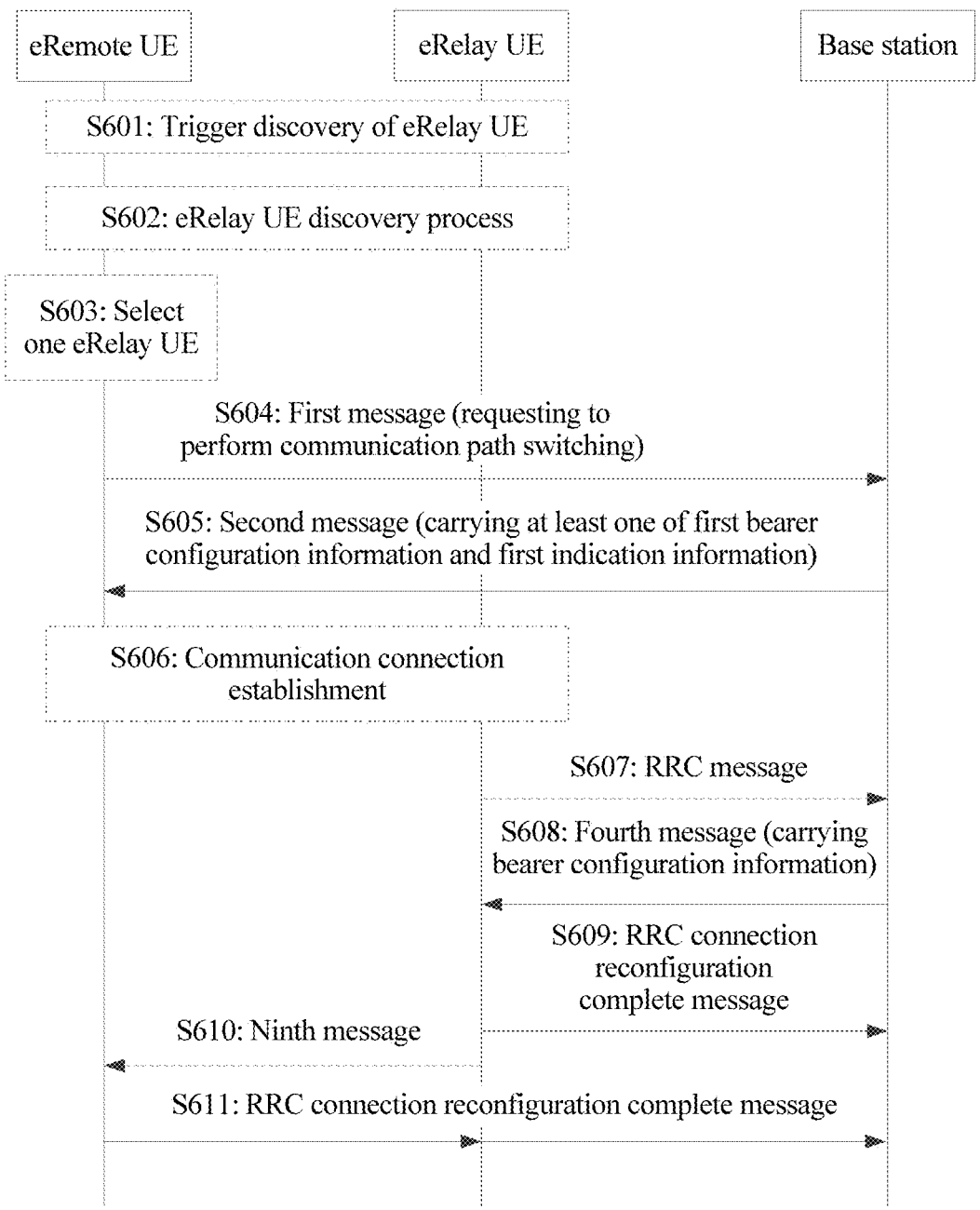
FIG. 6 is a flowchart of a communication path switching method according to an embodiment of the present invention.

Referring to FIG. 6, an embodiment of the present invention provides a communication path switching method. In both the embodiment shown in FIG. 4 and the embodiment shown in FIG. 5, the eRemote UE first establishes the communication connection to the eRelay UE and then sends the first message to the base station. In this embodiment of the present invention, the eRemote UE first sends the first message to the base station and then establishes the communication connection to the eRelay UE. In addition, in this embodiment of the present invention, a base station in a direct path and a base station in an indirect path are a same base station. A process of the method is described as follows.

Initially, eRemote UE is directly connected to a base station, and performs data communication with the base station by using a direct path.

For S601 to S603 in this embodiment of the present invention, refer to S401 to S403 in the embodiment shown in FIG. 4. Same steps are not repeatedly described. The following mainly describes steps different from those in the embodiment shown in FIG. 4.

S604: After selecting one eRelay UE, the eRemote UE sends a first message to the base station, where the first message is used to request the base station to perform communication path switching, to be specific, request to switch a communication path between the eRemote UE and the base station from the direct path to an indirect path used for communicating with the base station by using the eRelay UE. For example, the first message is an RRC message. For information carried in the RRC message, refer to the description of S405 in the embodiment shown in FIG. 4.

Because no communication connection is established between the eRemote UE and the eRelay UE in this embodiment of the present invention, the eRemote UE cannot obtain an identifier of the eRelay UE by using the communication connection to the eRelay UE. Then, if the eRemote UE does not know the identifier of the eRelay UE in advance, the first message cannot carry the identifier of the eRelay UE; or if the eRemote UE knows the identifier of the eRelay UE in advance, the first message may carry the identifier of the eRelay UE.

S605: The base station sends a second message to the eRemote UE, where the second message carries at least one of first bearer configuration information and first indication information that is used to instruct the eRemote UE to perform the communication path switching. The second indication information is used to instruct the eRemote UE to perform the communication path switching, and the first bearer configuration information includes radio bearer configuration information of a link between the eRemote UE and the eRelay UE and/or configuration information of a PDCP layer between the eRemote UE and the base station. Then, the eRemote UE receives the second message. For example, the second message is an RRC connection reconfiguration message.

After receiving the first message, the base station determines, based on the cell identity of the serving cell of the eRelay UE that is included in the first message, that the serving cell of the eRelay UE belongs to the local base station or belongs to another adjacent base station. In this embodiment of the present invention, that the serving cell of the eRelay UE is a cell of the local base station is used as an example. Then, if the base station allows the eRemote UE to perform the communication path switching, the base station sends the second message to the eRemote UE.

S606: After receiving the second message, the eRemote UE first establishes a communication connection to the eRelay UE selected by the eRemote UE. In addition, the eRemote UE further configures a corresponding radio bearer based on the second message.

S607: The eRelay UE sends an RRC message to the base station, where the RRC message is used to notify the base station that the eRelay UE can serve as relay UE of the eRemote UE. Then, the base station receives the RRC message.

If the eRelay UE is in an RRC_IDLE state when establishing the communication connection to the eRemote UE, the eRelay UE first initiates an RRC connection establishment process, to enter an RRC_CONNECTED state. In the RRC_CONNECTED state, the eRelay UE sends the RRC message to the base station. Certainly, if the eRelay UE is already in the RRC_CONNECTED state when establishing the communication connection to the eRemote UE, the eRelay UE may directly send the RRC message to the base station. The RRC message includes at least one of the following information:

an identifier of the eRemote UE for which the eRelay UE can serve as relay UE; and a short-range communications technology between the eRemote UE and the eRelay UE, for example, an LTE sidelink technology, a Bluetooth technology, or a WLAN technology.

S608: After receiving the RRC message, the base station sends a fourth message to the eRelay UE, where the fourth message carries third bearer configuration information and an identifier of the eRemote UE. In addition, the fourth message further carries second bearer configuration information and/or second indication information. The second indication information is used to instruct the eRelay UE to provide the eRemote UE with indirect-path support. The second bearer configuration information and the third bearer configuration information are used by the eRelay UE to configure radio bearers. Then, the eRelay UE receives the fourth message. For example, the fourth message is an RRC connection reconfiguration message. The RRC connection reconfiguration message is used to configure, for the eRelay UE, a radio bearer used for carrying control signaling and user-plane data of the eRemote UE.

For a description of content such as the second bearer configuration information and the third bearer configuration information, refer to the related description of S406 in the embodiment shown in FIG. 4.

S609: The eRelay UE configures the corresponding radio bearer based on the fourth message. After completing RRC connection reconfiguration, the eRelay UE sends an RRC connection reconfiguration complete message to the base station. Then, the base station receives the RRC connection reconfiguration complete message.

For details about how the eRelay UE configures the radio bearer, refer to the related description of S407 in the embodiment shown in FIG. 4.

S610: The eRelay UE sends a ninth message to the eRemote UE, where the ninth message is used to notify the eRemote UE that the eRelay UE can start to forward, for the eRemote UE, service data between the eRemote UE and the base station. The ninth message may be a message in a process of establishing the communication connection to the eRelay UE selected by the eRemote UE in S606, or may be an independent message.

S606, S607, and S610 are optional steps. To differentiate from mandatory steps, these steps are denoted by using dashed lines in FIG. 6.

S611: After confirming that the eRelay UE can forward, for the eRemote UE, the service data between the eRemote UE and the base station, the eRemote UE stops data transmission performed between the eRemote UE and the base station by using the direct path, to be specific, disconnects the direct path from the base station. In addition, the eRemote UE sends an RRC connection reconfiguration complete message to the base station by using the eRelay UE. Afterwards, the eRemote UE starts data transmission with the base station by using the eRelay UE.

As described in S604, the first message may carry the cell identity of the serving cell of the eRelay UE. In this case, if the eRemote UE and the eRelay UE perform the communication connection by using a 3GPP technology, methods for obtaining the cell identity of the serving cell of the eRelay UE by the eRemote UE include but are not limited to the following several methods:

1. The eRelay UE includes the cell identity of the serving cell of the eRelay UE in a to-be-sent sidelink-specific master information block (Master Information Block, MIB) message.

2. The eRelay UE includes the cell identity of the serving cell of the eRelay UE in a discovery message to be sent to the eRemote UE. The discovery message may be a discovery announcement message or a discovery response message.

If the eRemote UE and the eRelay UE perform the communication connection by using a non-3GPP technology, for a manner in which the eRemote UE obtains the cell identity of the serving cell of the eRelay UE, refer to the description of the embodiment shown in FIG. 4.

When the solution provided in this embodiment of the present invention is used, if the process of establishing the communication connection to the eRelay UE selected by the eRemote UE fails in S606, an issue about how the eRemote UE handles configuration of a radio bearer of the link between the eRemote UE and the eRelay UE needs to be considered. For this, this embodiment of the present invention provides the following solutions:

1. After receiving the second message sent by the base station, the eRemote UE does not apply a radio bearer configuration of the link between the eRemote UE and the eRelay UE until the eRemote UE establishes the connection to the eRelay UE.

2. After receiving the second message, the eRemote UE immediately applies a radio bearer configuration of the link between the eRemote UE and the eRelay UE. When the eRemote UE determines that the establishment of the communication connection to the eRelay UE fails, the eRemote UE releases the radio bearer configuration.

The foregoing two methods may be selected based on an actual case, and solutions in actual application are not limited to the foregoing two solutions.

In the foregoing implementation provided in this embodiment of the present invention, the eRemote UE disconnects the direct path from the base station in S611. As an alternative to this implementation, the eRemote UE may disconnect the direct path from the base station immediately after receiving the second message. When such an implementation is used, if the process of establishing the communication connection to the eRelay UE selected by the eRemote UE fails in S606, the eRemote UE may choose to trigger an RRC connection re-establishment process. Specifically, after the eRemote UE receives a connection establishment reject message of the eRelay UE, the eRemote UE triggers the RRC connection re-establishment process. Alternatively, when the eRemote UE sends a connection establishment request message to the eRelay UE and receives no response message of the eRelay UE after preset duration, the eRemote UE triggers the RRC connection re-establishment process. The preset duration may be pre-configured by the base station, or may be set by the eRemote UE according to experience.

Figure 7:
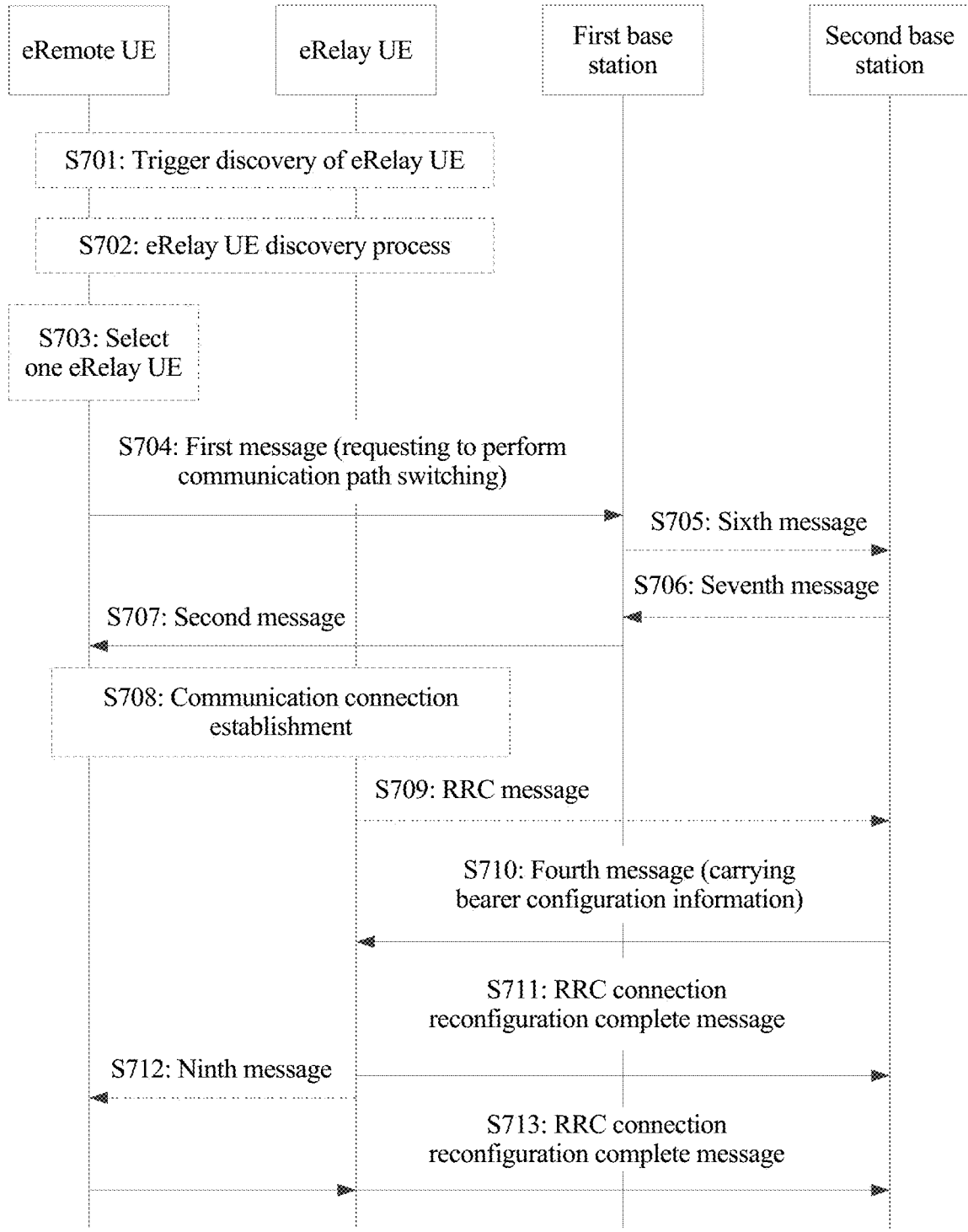
FIG. 7 is a flowchart of a communication path switching method according to an embodiment of the present invention.

Referring to FIG. 7, an embodiment of the present invention provides a communication path switching method. In this embodiment of the present invention, the eRemote UE also sends the first message to the base station first and then establishes the communication connection to the eRelay UE. In addition, in this embodiment of the present invention, a base station in a direct path and a base station in an indirect path are different base stations. A process of the method is described as follows.

Initially, eRemote UE is directly connected to a base station, and performs data communication with the base station by using a direct path.

For S701 to S704 in this embodiment of the present invention, refer to S601 to S604 in the embodiment shown in FIG. 6. Same steps are not repeatedly described. The following mainly describes steps different from those in the embodiment shown in FIG. 6.

S705: A first base station sends a sixth message to a second base station, where the sixth message is used to request to hand over the eRemote UE from the first base station to the second base station, and the sixth message includes all information carried in the first message. For example, the sixth message is a handover request message. Then, the second base station receives the sixth message.

After receiving the first message, the first base station determines, based on a cell identity of a serving cell of the eRelay UE that is included in the first message, that the serving cell of the eRelay UE belongs to the local base station or belongs to another adjacent base station. In this embodiment of the present invention, that the serving cell of the eRelay UE is a cell of another base station is used as an example. The another base station is referred to as the second base station, and the local base station is referred to as the first base station. Then, the first base station sends the sixth message to a serving base station of the eRelay UE, namely, the second base station. The sixth message includes all the information included by the eRemote UE in the first message. In addition, the first base station may further notify the second base station in the sixth message that a reason for a current handover is that the eRemote UE needs to perform communication path switching from the direct communication path to an indirect communication path.

S706: The second base station sends a seventh message to the first base station. Then, the first base station receives the seventh message. The seventh message carries first bearer configuration information, that is, carries radio bearer configuration information of a link between the eRemote UE and the eRelay UE and/or configuration information of a PDCP layer between the eRemote UE and the base station.

For example, the seventh message is a handover confirm message. The seventh message carries information included in the sixth message.

After the second base station receives the sixth message, if the second base station allows the eRemote UE to perform the communication path switching and perform communication in an indirect-connection manner with the second base station by using the eRelay UE, the second base station sends the seventh message to the first base station.

S707: After receiving the seventh message, the first base station sends a second message to the eRemote UE, where the second message is used to instruct the eRemote UE to perform the communication path switching. The second message carries information carried in the seventh message. For example, the second message is an RRC connection reconfiguration message.

S708: After receiving the second message, the eRemote UE establishes a communication connection to the eRelay UE selected by the eRemote UE. In addition, the eRemote UE further configures a corresponding radio bearer based on the second message.

S709: The eRelay UE sends an RRC message to the second base station, where the RRC message is used to notify the second base station that the eRelay UE can serve as relay UE of the eRemote UE. Then, the second base station receives the RRC message.

If the eRelay UE is in an RRC_IDLE state when establishing the communication connection to the eRemote UE, the eRelay UE first initiates an RRC connection establishment process, to enter an RRC_CONNECTED state. In the RRC_CONNECTED state, the eRelay UE sends the RRC message to the second base station. Certainly, if the eRelay UE is already in the RRC_CONNECTED state when establishing the communication connection to the eRemote UE, the eRelay UE may directly send the RRC message to the second base station. The RRC message includes at least one of the following information:

an identifier of the eRemote UE for which the eRelay UE can serve as relay UE; and a short-range communications technology between the eRemote UE and the eRelay UE, for example, an LTE sidelink technology, a Bluetooth technology, or a WLAN technology.

S710: After receiving the RRC message, the second base station sends a fourth message to the eRelay UE. For content carried in the fourth message and the like, refer to the related description of S406 in the embodiment shown in FIG. 4.

S711: The eRelay UE configures a corresponding radio bearer based on the fourth message. After completing RRC connection reconfiguration, the eRelay UE sends an RRC connection reconfiguration complete message to the second base station. Then, the second base station receives the RRC connection reconfiguration complete message.

For details about how the eRelay UE configures the radio bearer, refer to the related description of S407 in the embodiment shown in FIG. 4.

S712: The eRelay UE sends a ninth message to the eRemote UE, where the ninth message is used to notify the eRemote UE that the eRelay UE can start to forward, for the eRemote UE, service data between the eRemote UE and the base station. The ninth message may be a message in a process of establishing the communication connection to the eRelay UE selected by the eRemote UE in S708, or may be an independent message.

S705, S706, S708, S709, and S712 are optional steps. To differentiate from mandatory steps, these steps are denoted by using dashed lines in FIG. 7.

S713: After confirming that the eRelay UE can forward, for the eRemote UE, the service data between the eRemote UE and the second base station, the eRemote UE stops data transmission performed between the eRemote UE and the first base station by using the direct path, to be specific, disconnects the direct path from the first base station. In addition, the eRemote UE sends an RRC connection reconfiguration complete message to the second base station by using the eRelay UE. Afterwards, the eRemote UE starts data transmission with the second base station by using the eRelay UE.

When the solution provided in this embodiment of the present invention is used, if the process of establishing the communication connection to the eRelay UE selected by the eRemote UE fails in S708, for a manner in which the eRemote UE handles a radio bearer configuration of the link between the eRemote UE and the eRelay UE, refer to the related description in the embodiment shown in FIG. 6.

In the foregoing implementation provided in this embodiment of the present invention, the eRemote UE disconnects the direct path from the base station in S713. As an alternative to this implementation, the eRemote UE may disconnect the direct path from the first base station immediately after receiving the second message. When such an implementation is used, if the process of establishing the communication connection to the eRelay UE selected by the eRemote UE fails in S708, the eRemote UE may also choose to trigger an RRC connection re-establishment process. For a description of this part of content, refer to the embodiment shown in FIG. 6.

In the foregoing implementation provided in this embodiment of the present invention, it may be considered that the eRemote UE accesses the second base station by using the eRelay UE. Then, as an alternative to this implementation, the eRemote UE may first access the second base station, and then switch to the indirect path, that is, as described above.

Optionally, in another implementation, the foregoing S706 and S707 are replaced with the following S714 to S718. As an alternative implementation, S714 to S718 are not illustrated in FIG. 7.

S714: The second base station sends a seventh message to the first base station. Then, the first base station receives the seventh message. The seventh message is a handover confirm message carrying a handover command.

After the second base station receives the sixth message, if the second base station allows the eRemote UE to perform the communication path switching and perform communication in an indirect-connection manner with the second base station by using the eRelay UE, the second base station sends the seventh message to the first base station.

S715: After receiving the seventh message, the first base station sends an eighth message to the eRemote UE, where the eighth message is used to instruct the eRemote UE to perform the handover. The eighth message carries the handover command carried in the seventh message. For example, the eighth message is an RRC connection reconfiguration message.

S716: The eRemote UE executes a normal handover process. To be specific, the eRemote UE completes the handover to the second base station by using a random access process.

S717: The eRemote UE sends an RRC connection reconfiguration complete message to the second base station. Then, the second base station receives the RRC connection reconfiguration complete message.

S718: After receiving the RRC connection reconfiguration complete message, the second base station sends a second message to the eRemote UE. The second message is used to instruct the eRemote UE to perform the communication path switching. The second message includes first bearer configuration information, that is, carries radio bearer configuration information of a link between the eRemote UE and the eRelay UE and/or configuration information of a PDCP layer between the eRemote UE and the base station. For example, the second message is an RRC connection reconfiguration message.

In the following, referring to FIG. 8, an embodiment of the present invention describes a process of establishing a communication connection by eRemote UE and eRelay UE. The communication connection in this embodiment of the present invention is a communication connection in a 3GPP technology, for example, a sidelink connection.

First, the eRemote UE is directly connected to a base station by using a Uu interface, and performs data communication in a direct communication manner.

If the eRemote UE determines that channel quality of a Uu link is less than a threshold configured by the base station, the eRemote UE triggers an eRelay UE discovery process. This process may also be considered as a process in which the eRemote UE and eRelay UE discover each other. For example, if the eRemote UE sends a broadcast message, eRelay UE that receives this broadcast message may return a response to the eRemote UE, and the eRemote UE determines that the eRelay UE is discovered. Alternatively, eRelay UE proactively sends a broadcast message. If the eRemote UE receives this broadcast message, the eRemote UE determines that the eRelay UE is discovered.

If the eRemote UE discovers one or more eRelay UEs that meet a condition, the eRemote UE selects one from the eRelay UEs. The foregoing is an eRelay UE selection process shown in FIG. 8. The following describes a process after eRelay UE selection ends.

S801: The eRemote UE starts to establish a communication connection to the selected eRelay UE. The eRemote UE first sends a Sidelink UE Information message to the base station, where the message is used to notify the base station that the eRemote UE needs to communicate with the eRelay UE, and request for a resource for communicating with the eRelay UE from the base station. Then, the base station receives the Sidelink UE Information message. The Sidelink UE Information message carries at least one of the following two pieces of indication information:

a resource that is requested by the eRemote UE for communicating with the eRelay UE in a layer 2 relay UE manner; and an application scenario in which the eRemote UE requests for a resource, for example, communication for commercial (Commercial) application or communication for public safety (Public Safety) application.

The base station may allocate different resources to the eRemote UE in different application scenarios.

S802: The base station sends an RRC Connection Reconfiguration message to the eRemote UE, to configure, for the eRemote UE, a resource allocation manner used for the communication between the eRemote UE and the eRelay UE. Then, the eRemote UE receives the RRC Connection Reconfiguration message.

If the resource allocation manner configured by the base station for the eRemote UE is a resource allocation manner of UE autonomous resource selection, the base station includes, in the RRC Connection Reconfiguration message, a resource pool allocated to the eRemote UE.

S803: The eRemote UE performs configuration based on content in the RRC Connection Reconfiguration message. Subsequently, the eRemote UE sends an RRC Connection Reconfiguration Complete message to the base station. Then, the base station receives the RRC Connection Reconfiguration Complete message.

S804: The eRemote UE sends a DIRECT_COMMUNICATION_REQUEST message to the eRelay UE on a resource in a resource pool allocated by the base station or on a resource scheduled by the base station. Then, the eRelay UE receives the DIRECT_COMMUNICATION_REQUEST message in a resource pool allocated by the base station.

S805: After receiving the DIRECT_COMMUNICATION_REQUEST message sent by the eRemote UE, the eRelay UE sends a Sidelink UE Information message to the base station, to notify the base station that the eRelay UE needs to communicate with the eRemote UE, and request a resource for communicating with the eRemote UE from the base station. Then, the base station receives the Sidelink UE Information message. The Sidelink UE Information message carries at least one of the following two pieces of indication information:

a resource that is requested by the eRelay UE for communicating with the eRemote UE in a layer 2 relay UE manner; and an application scenario in which the eRelay UE requests for a resource, for example, communication for commercial application or communication for public safety application.

After the eRelay UE receives the DIRECT_COMMUNICATION_REQUEST message sent by the eRemote UE, if the eRelay UE is currently in an RRC_IDLE state, the eRelay UE first enters an RRC_CONNECTED state by using an RRC connection establishment process. Afterwards, the eRelay UE sends the Sidelink UE Information message to the base station.

S806: The base station sends an RRC Connection Reconfiguration message to the eRelay UE, to configure, for the eRelay UE, a resource allocation manner used for the communication between the eRelay UE and the eRemote UE. Then, the eRelay UE receives the RRC Connection Reconfiguration message.

If the resource allocation manner configured by the base station for the eRelay UE is a resource allocation manner of UE autonomous resource selection, the base station includes, in the eRRC Connection Reconfiguration message, the resource pool allocated to the eRelay UE.

S807: The eRelay UE performs configuration based on content in the RRC Connection Reconfiguration message, and the eRelay UE sends a DIRECT_COMMUNICATION_ACCEPT message to the eRemote UE on a resource in the resource pool allocated by the base station or on a resource scheduled by the base station. Then, the eRemote UE receives the DIRECT_COMMUNICATION_ACCEPT message.

S808: After receiving the DIRECT_COMMUNICATION_ACCEPT message sent by the eRelay UE, the eRemote UE sends a first message to the base station.

S809: The base station sends a fourth message to the eRelay UE, where the fourth message carries third bearer configuration information and an identifier of the eRemote UE. In addition, the fourth message further carries second bearer configuration information and/or second indication information. Then, the eRelay UE receives the fourth message.

For detailed content of S808 and S809, refer to the related description in the embodiment shown in FIG. 4 or the embodiment shown in FIG. 5. In addition, for a step following S809, also refer to the embodiment shown in FIG. 4 or the embodiment shown in FIG. 5.

When a base station of the eRelay UE and a base station of the eRemote UE are different base stations, the base station of the eRemote UE includes, in a sixth message to be sent to the base station of the eRelay UE, information carried in the first message sent by the eRemote UE in S808.

In this embodiment of the present invention, because data is forwarded by an adaptation layer instead of an IP layer, the base station cannot determine the eRemote UE and the eRelay UE by using IP addresses. Therefore, after the eRemote UE and the eRelay UE establish a sidelink connection, the base station needs to obtain and store a correspondence between the identifier of the eRemote UE and an identifier of the eRelay UE, so that the base station can configure radio bearers for the corresponding eRemote UE and eRelay UE. When the base station needs to send downlink data to the eRemote UE and the eRelay UE, the base station can determine the eRemote UE and the eRelay UE based on the identifiers. Based on the sidelink connection establishment process between the eRemote UE and the eRelay UE shown in FIG. 8, the base station obtains the identifier of the eRemote UE and the identifier of the eRelay UE in implementations including but not limited the following several implementations:

1. Implementation 1:

In detailed S805, after the eRelay UE receives the DIRECT_COMMUNICATION_REQUEST message sent by the eRemote UE, the eRelay UE allocates, to the eRemote UE, an identifier that can uniquely identify the eRemote UE on the eRelay UE, where the identifier is referred to as a first identifier, or referred to as a local identity (Local ID) of the eRemote UE. The eRelay UE sends the Sidelink UE Information message to the base station, where the Sidelink UE Information message may carry a layer-2 ID of the eRelay UE. In addition, the Sidelink UE Information message may further carry a correspondence between a layer-2 ID of the eRemote UE that sends the DIRECT_COMMUNICATION_REQUEST message to the eRelay UE and the local ID of the eRemote UE. In this way, the base station obtains the identifier of the eRemote UE, that is, the local ID.

In detailed S808, the eRemote UE sends the first message to the base station, where the first message includes the layer-2 ID of the eRelay UE that establishes the sidelink connection to the eRemote UE. In addition, the first message may further include the layer-2 ID of the eRemote UE.

Then, the base station may associate the identifier of the eRelay UE and the identifier of the eRemote UE by using the layer-2 ID of the eRelay UE.

The layer-2 ID of the eRelay UE and the layer-2 ID of the eRemote UE are used for the communication between the eRelay UE and the eRemote UE, and do not need to be learned of by the base station. In this embodiment of the present invention, the layer-2 ID is used only to associate the identifier of the eRelay UE and the identifier of the eRemote UE.

Moreover, in an implementation, the identifier of the eRemote UE that is learned of by the base station, that is, the local ID, is allocated by the eRelay UE. Compared with a cell radio network temporary identifier (Cell Radio Network Temporary Identify, C-RNTI) of the eRemote UE, the local ID has a shorter length and is easy to be carried in a message, and therefore helps reduce overheads.

2. Implementation 2:

In detailed S805, after receiving the DIRECT_COMMUNICATION_REQUEST message sent by the eRemote UE, the eRelay UE sends the Sidelink UE Information message to the base station. The Sidelink UE Information message includes a layer-2 ID of the eRelay UE and a layer-2 ID of the eRemote UE that sends the Direct_Connection_request message to the eRelay UE.

In detailed S806, after receiving the Sidelink UE Information message sent by the eRelay UE, the base station allocates one local ID to the eRemote UE. The base station sends the RRC Connection Reconfiguration message to the eRelay UE, to configure, for the eRelay UE, the resource allocation manner used for the communication between the eRelay UE and the eRemote UE. Then, the eRelay UE receives the RRC Connection Reconfiguration message.

The RRC Connection Reconfiguration message includes a correspondence between the layer-2 ID of the eRemote UE and the local ID of the eRemote UE.

In detailed S808, the eRemote UE sends the first message to the base station. The first message includes the layer-2 ID of the eRelay UE that establishes the sidelink connection to the eRemote UE. In addition, the first message may further include the layer-2 ID of the eRemote UE.

3. Implementation 3:

In detailed S805, after receiving the DIRECT_COMMUNICATION_REQUEST message sent by the eRemote UE, the eRelay UE sends the Sidelink UE Information message to the base station. The Sidelink UE Information message includes a layer-2 ID of the eRelay UE and a layer-2 ID of the eRemote UE that sends the DIRECT_COMMUNICATION_REQUEST message to the eRelay UE.

In detailed S808, the eRemote UE sends the first message to the base station. The first message includes the layer-2 ID of the eRelay UE that establishes the sidelink connection to the eRemote UE. In addition, the first message may further include the layer-2 ID of the eRemote UE.

In detailed S809, after receiving the first message, the base station allocates one local ID to the eRemote UE. The base station sends the fourth message to the eRelay UE, for example, an RRC connection reconfiguration message. The fourth message includes a correspondence between the layer-2 ID of the eRemote UE and the local ID of the eRemote UE. Then, the eRelay UE receives the fourth message.

In Implementation 1 to Implementation 3, the identifier of the eRemote UE that is obtained by the base station is the local ID of the eRemote UE. The base station can uniquely determine one eRemote UE based on the identifier of the eRelay UE and the local ID of the eRemote UE.

4. Implementation 4:

In detailed S805, after receiving the DIRECT_COMMUNICATION_REQUEST message sent by the eRemote UE, the eRelay UE allocates one local ID to the eRemote UE. The eRelay UE sends the Sidelink UE Information message to the base station. The Sidelink UE Information message includes a correspondence between a layer-2 ID of the eRemote UE that sends the DIRECT_COMMUNICATION_REQUEST message to the eRelay UE and the local ID of the eRemote UE.

In detailed S807, the eRelay UE sends the DIRECT_COMMUNICATION_ACCEPT message to the eRemote UE, where the DIRECT_COMMUNICATION_ACCEPT message may carry the identifier of the eRelay UE. For example, the identifier of the eRelay UE is a C-RNTI of the eRelay UE in this embodiment of the present invention. The identifier of the eRelay UE may be transmitted by using one MAC CE in a MAC PDU that carries the DIRECT_COMMUNICATION_ACCEPT message.

In detailed S808, the eRemote UE sends the first message to the base station. The first message includes the C-RNTI of the eRelay UE that establishes the sidelink connection to the eRemote UE. In addition, the first message may further include the layer-2 ID of the eRemote UE.

S. Implementation 5:

In detailed S805, after receiving the DIRECT_COMMUNICATION_REQUEST message sent by the eRemote UE, the eRelay UE sends the Sidelink UE Information message to the base station. The Sidelink UE Information message includes a layer-2 ID of the eRemote UE that sends the DIRECT_COMMUNICATION_REQUEST message to the eRelay UE.

In detailed S806, after receiving the Sidelink UE Information message sent by the eRelay UE, the base station allocates one local ID to the eRemote UE. The base station sends the RRC connection reconfiguration message to the eRelay UE. The RRC connection reconfiguration message includes a correspondence between the layer-2 ID of the eRemote UE and the local ID of the eRemote UE.

In detailed S807, when sending the DIRECT_COMMUNICATION_ACCEPT message to the eRemote UE, the eRelay UE also notifies the identifier of the eRelay UE to the eRemote UE. The identifier of the eRelay UE may be a C-RNTI of the eRelay UE in this embodiment of the present invention. The identifier of the eRelay UE may be transmitted by using one MAC CE in a MAC PDU that carries the DIRECT_COMMUNICATION_ACCEPT message.

In detailed S808, the eRemote UE sends the first message to the base station. The first message includes the C-RNTI of the eRelay UE that establishes the sidelink connection to the eRemote UE. In addition, the first message may further include the layer-2 ID of the eRemote UE.

6. Implementation 6:

In detailed S805, after receiving the DIRECT_COMMUNICATION_REQUEST message sent by the eRemote UE, the eRelay UE sends the Sidelink UE Information message to the base station. The Sidelink UE Information message includes a layer-2 ID of the eRemote UE that sends the DIRECT_COMMUNICATION_REQUEST message to the eRelay UE.

In detailed S807, when sending the DIRECT_COMMUNICATION_ACCEPT message to the eRemote UE, the eRelay UE also notifies the identifier of the eRelay UE to the eRemote UE. The identifier of the eRelay UE may be a C-RNTI of the eRelay UE in this embodiment of the present invention. The identifier of the eRelay UE may be transmitted by using one MAC CE in a MAC PDU that carries the DIRECT_COMMUNICATION_ACCEPT message.

In detailed S808, the eRemote UE sends the first message to the base station. The first message includes the C-RNTI of the eRelay UE that establishes the sidelink connection to the eRemote UE. In addition, the first message may further include the layer-2 ID of the eRemote UE.

In detailed S809, after receiving the first message sent by the eRemote UE, the base station allocates one local ID to the eRemote UE. The base station sends the fourth message to the eRelay UE. The fourth message includes a correspondence between the layer-2 ID of the eRemote UE and the local ID of the eRemote UE.

In Implementation 4 to Implementation 6, the identifier of the eRemote UE that is obtained by the base station is the local ID of the eRemote UE. The base station can uniquely determine one eRemote UE based on the identifier of the eRelay UE and the local ID of the eRemote UE. The identifier of the eRelay UE that is obtained by the base station is always the C-RNTI of the eRelay UE.

7. Implementation 7:

In detailed S804, the eRemote UE sends the DIRECT_COMMUNICATION_REQUEST message to the eRelay UE, where a C-RNTI of the eRemote UE is sent together with the DIRECT_COMMUNICATION_REQUEST message. The C-RNTI of the eRemote UE may be transmitted by using one MAC CE in a downlink MAC PDU that carries the DIRECT_COMMUNICATION_REQUEST message.

In detailed S805, after receiving the DIRECT_COMMUNICATION_REQUEST message sent by the eRemote UE, the eRelay UE allocates one local ID to the eRemote UE. The eRelay UE sends the Sidelink UE Information message to the base station. The Sidelink UE Information message includes the C-RNT of the eRemote UE that sends the DIRECT_COMMUNICATION_REQUEST message to the eRelay UE. In addition, the Sidelink UE Information message may further include a correspondence between the C-RNTI of the eRemote UE that sends the DIRECT_COMMUNICATION_REQUEST message to the eRelay UE and the local ID of the eRemote UE.

8. Implementation 8:

In detailed S804, the eRemote UE sends the DIRECT_COMMUNICATION_REQUEST message to the eRelay UE, where a C-RNTI of the eRemote UE is sent together with the DIRECT_COMMUNICATION_REQUEST message. The C-RNTI of the eRemote UE may be transmitted by using one MAC CE in a downlink MAC PDU that carries the DIRECT_COMMUNICATION_REQUEST message.

In detailed S805, the eRelay UE sends the Sidelink UE Information message to the base station. The Sidelink UE Information message includes the C-RNTI of the eRemote UE that sends the DIRECT_COMMUNICATION_REQUEST message to the eRelay UE. In addition, the Sidelink UE Information message further includes a layer-2 ID of the eRemote UE that sends the DIRECT_COMMUNICATION_REQUEST message to the eRelay UE.

In detailed S806, after receiving the Sidelink UE Information message sent by the eRelay UE, the base station allocates one local ID to the eRemote UE. The base station sends the RRC connection reconfiguration message to the eRelay UE. The RRC connection reconfiguration message includes a correspondence between the layer-2 ID of the eRemote UE and the local ID of the eRemote UE.

9. Implementation 9:

In detailed S804, the eRemote UE sends the DIRECT_COMMUNICATION_REQUEST message to the eRelay UE, where a C-RNTI of the eRemote UE is sent together with the DIRECT_COMMUNICATION_REQUEST message. The C-RNTI of the eRemote UE may be transmitted by using one MAC CE in a downlink MAC PDU that carries the DIRECT_COMMUNICATION_REQUEST message.

In detailed S805, the eRelay UE sends the Sidelink UE Information message to the base station. The Sidelink UE Information message includes the C-RNTI of the eRemote UE that sends the DIRECT_COMMUNICATION_REQUEST message to the eRelay UE. In addition, the Sidelink UE Information message further includes a layer-2 ID of the eRemote UE that sends the DIRECT_COMMUNICATION_REQUEST message to the eRelay UE.

In detailed S809, after receiving the first message sent by the eRemote UE, the base station allocates one local ID to the eRemote UE. The base station sends the fourth message to the eRelay UE. The fourth message includes a correspondence between the layer-2 ID of the eRemote UE and the local ID of the eRemote UE.

10. Implementation 10:

In detailed S805, after receiving the DIRECT_COMMUNICATION_REQUEST message sent by the eRemote UE, the eRelay UE allocates one local ID to the eRemote UE. The eRelay UE sends the Sidelink UE Information message to the base station. The Sidelink UE Information message includes a correspondence between a layer-2 ID of the eRemote UE that sends the DIRECT_COMMUNICATION_REQUEST message to the eRelay UE and the local ID of the eRemote UE.

In detailed S808, the eRemote UE sends the first message to the base station. The first message includes the layer-2 ID of the eRemote UE.

11. Implementation 11:

In detailed S805, the eRelay UE sends the Sidelink UE Information message to the base station. The Sidelink UE Information message includes a layer-2 ID of the eRemote UE that sends the DIRECT_COMMUNICATION_REQUEST message to the eRelay UE.

In detailed S806, after receiving the Sidelink UE Information message sent by the eRelay UE, the base station allocates one local ID to the eRemote UE. The base station sends the RRC connection reconfiguration message to the eRelay UE. The RRC connection reconfiguration message includes a correspondence between the layer-2 ID of the eRemote UE and the local ID of the eRemote UE.

In detailed S808, the eRemote UE sends the first message to the base station. The first message includes the layer-2 ID of the eRemote UE.

12. Implementation 12:

In detailed S805, the eRelay UE sends the Sidelink UE Information message to the base station. The Sidelink UE Information message includes a layer-2 ID of the eRemote UE that sends the DIRECT_COMMUNICATION_REQUEST message to the eRelay UE.

In detailed S808, the eRemote UE sends the first message to the base station. The first message includes the layer-2 ID of the eRemote UE.

In detailed S809, after receiving the first message sent by the eRemote UE, the base station allocates one local ID to the eRemote UE. The base station sends the fourth message to the eRelay UE. The fourth message includes a correspondence between the layer-2 ID of the eRemote UE and the local ID of the eRemote UE.

Figure 8:
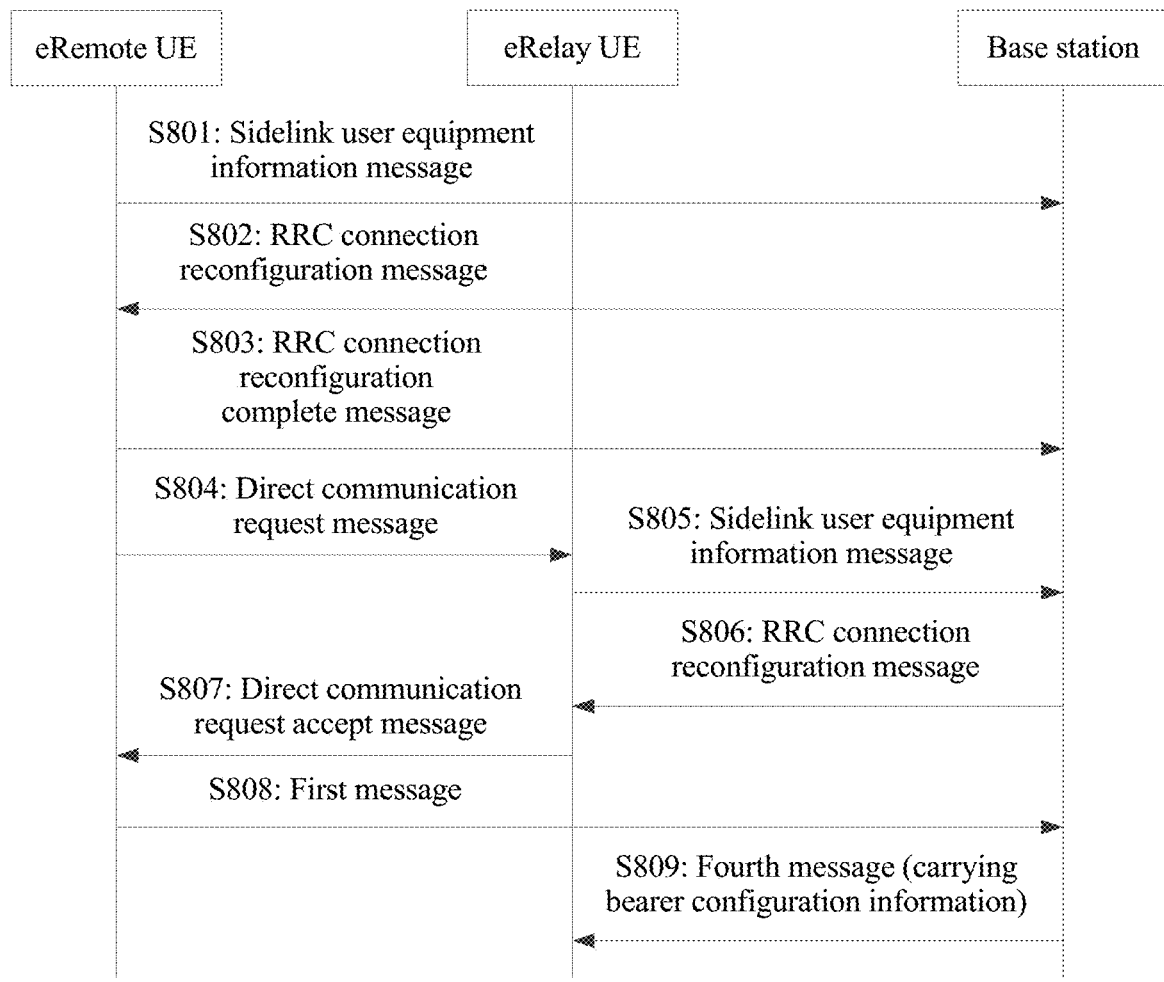
FIG. 8 is a flowchart of a process of establishing a communication connection by eRemote UE and eRelay UE by using a 3GPP technology according to an embodiment of the present invention.

It should be noted that, the foregoing several implementations are not illustrated in FIG. 8.

Figure 9:
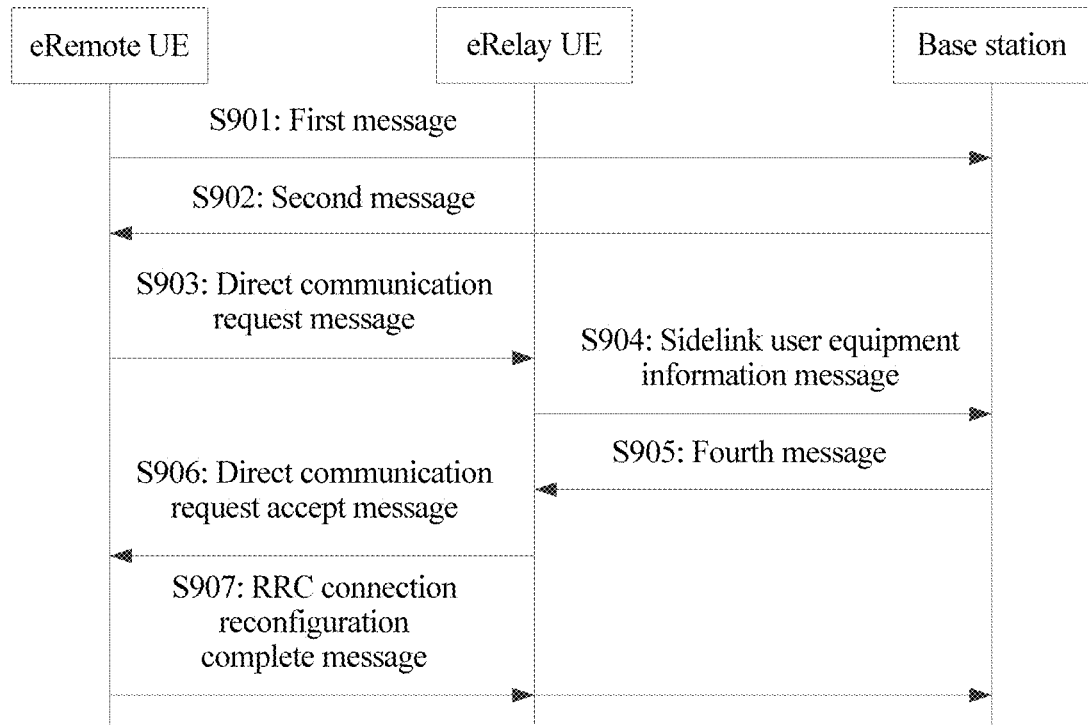
FIG. 9 is a flowchart of a process of establishing a communication connection by eRemote UE and eRelay UE by using a 3GPP technology according to an embodiment of the present invention.

Referring to FIG. 9, an embodiment of the present invention describes a process of establishing a communication connection by eRemote UE and eRelay UE. The communication connection in this embodiment of the present invention is a communication connection in a 3GPP technology, for example, a sidelink connection.

First, the eRemote UE is directly connected to a base station by using a Uu interface, and performs data communication in a direct communication manner.

If the eRemote UE determines that channel quality of a Uu link is less than a threshold configured by the base station, the eRemote UE triggers an eRelay UE discovery process. This process may also be considered as a process in which the eRemote UE and eRelay UE discover each other. For example, if the eRemote UE sends a broadcast message, eRelay UE that receives this broadcast message may return a response to the eRemote UE, and the eRemote UE determines that the eRelay UE is discovered. Alternatively, eRelay UE proactively sends a broadcast message. If the eRemote UE receives this broadcast message, the eRemote UE determines that the eRelay UE is discovered.

If the eRemote UE discovers one or more eRelay UEs that meet a condition, the eRemote UE selects one from the eRelay UEs. The foregoing is an eRelay UE selection process shown in FIG. 9. The following describes a process after eRelay UE selection ends.

S901: The eRemote UE sends a first message to the base station. Then, the base station receives the first message. For a description of the first message, refer to the foregoing embodiments.

In addition, the first message carries at least one of the following two pieces of indication information:

a resource that is requested by the eRemote UE for communicating with the eRelay UE in a layer 2 relay UE manner; and an application scenario in which the eRemote UE requests for a resource, for example, communication for commercial application or communication for public safety application.

S902: The base station sends a second message to the eRemote UE. Then, the eRemote UE receives the second message. For example, the second message is an RRC Connection Reconfiguration message. For a description of the second message, refer to the foregoing embodiments.

S903: The eRemote UE sends a DIRECT_COMMUNICATION_REQUEST message to the eRelay UE on a resource in a resource pool allocated by the base station or on a resource scheduled by the base station. Then, the eRelay UE receives the DIRECT_COMMUNICATION_REQUEST message in a resource pool allocated by the base station.

S904: After receiving the DIRECT_COMMUNICATION_REQUEST message sent by the eRemote UE, the eRelay UE sends a Sidelink UE Information message to the base station, to notify the base station that the eRelay UE needs to communicate with the eRemote UE, and request a resource for communicating with the eRemote UE from the base station. Then, the base station receives the Sidelink UE Information message. The Sidelink UE Information message carries at least one of the following two pieces of indication information:

a resource that is requested by the eRelay UE for communicating with the eRemote UE in a layer 2 relay UE manner; and an application scenario in which the eRelay UE requests for a resource, for example, communication for commercial application or communication for public safety application.

After the eRelay UE receives the DIRECT_COMMUNICATION_REQUEST message sent by the eRemote UE, if the eRelay UE is currently in an RRC_IDLE state, the eRelay UE first enters an RRC_CONNECTED state by using an RRC connection establishment process. Afterwards, the eRelay UE sends the Sidelink UE Information message to the base station.

S905: The base station sends a fourth message to the eRelay UE, to configure, for the eRelay UE, a resource allocation manner used for the communication between the eRelay UE and the eRemote UE. Then, the eRelay UE receives the fourth message. For example, the fourth message is an RRC Connection Reconfiguration message.

S906: The eRelay UE performs configuration based on content in the RRC Connection Reconfiguration message, and the eRelay UE sends a DIRECT_COMMUNICATION_ACCEPT message to the eRemote UE on a resource in the resource pool allocated by the base station or on a resource scheduled by the base station. Then, the eRemote UE receives the DIRECT_COMMUNICATION_ACCEPT message.

In the foregoing process, the eRemote UE maintains data transmission with the base station by using a direct communication link.

S907: The eRemote UE performs configuration based on content in the second message. After the configuration is completed, the eRemote UE sends an RRC Connection Reconfiguration Complete message to the base station by using the eRelay UE. Then, the base station receives the RRC Connection Reconfiguration Complete message.

Afterwards, the eRemote UE performs data transmission with the base station by using the eRelay UE.

When a base station of the eRelay UE and a base station of the eRemote UE are different base stations, the base station of the eRemote UE includes, in a sixth message to be sent to the base station of the eRelay UE, information carried in the first message sent by the eRemote UE in S901.

In this embodiment of the present invention, after the eRemote UE and the eRelay UE establish the sidelink connection, the base station needs to obtain and store a correspondence between an identifier of the eRemote UE and an identifier of the eRelay UE. Based on the sidelink connection establishment process between the eRemote UE and the eRelay UE shown in FIG. 9, the base station obtains the identifier of the eRemote UE and the identifier of the eRelay UE in implementations including but not limited to the following several implementations:

1. Implementation 1:

In detailed S901, the eRemote UE sends the first message to the base station. Then, the base station receives the first message. The first message includes a layer-2 ID of the eRemote UE.

In detailed S904, after receiving the DIRECT_COMMUNICATION_REQUEST message sent by the eRemote UE, the eRelay UE allocates one local ID to the eRemote UE. The eRelay UE sends the Sidelink UE Information message to the base station. The Sidelink UE Information message includes a correspondence between the layer-2 ID of the eRemote UE that sends the DIRECT_COMMUNICATION_REQUEST message to the eRelay UE and the local ID of the eRemote UE.

2. Implementation 2:

In detailed S901, the eRemote UE sends the first message to the base station. Then, the base station receives the first message. The first message includes a layer-2 ID of the eRemote UE.

In detailed S904, after receiving the DIRECT_COMMUNICATION_REQUEST message sent by the eRemote UE, the eRelay UE sends the Sidelink UE Information message to the base station. The Sidelink UE Information message includes the layer-2 ID of the eRemote UE that sends the DIRECT_COMMUNICATION_REQUEST message to the eRelay UE.

In detailed S905, after receiving the Sidelink UE Information message sent by the eRelay UE, the base station allocates one local ID to the eRemote UE. The base station sends the fourth message to the eRelay UE. The fourth message includes a correspondence between the layer-2 ID of the eRemote UE and the local ID of the eRemote UE.

3. Implementation 3:

In detailed S903, the eRemote UE sends the DIRECT_COMMUNICATION_REQUEST message to the eRelay UE, where a C-RNTI of the eRemote UE is sent together with the DIRECT_COMMUNICATION_REQUEST message. The C-RNTI of the eRemote UE may be transmitted by using one MAC CE in a MAC PDU that carries the DIRECT_COMMUNICATION_REQUEST message.

In detailed S904, after receiving the DIRECT_COMMUNICATION_REQUEST message sent by the eRemote UE, the eRelay UE allocates one local ID to the eRemote UE. The eRelay UE sends the Sidelink UE Information message to the base station. The Sidelink UE Information message includes the C-RNTI of the eRemote UE that sends the DIRECT_COMMUNICATION_REQUEST message to the eRelay UE. In addition, the Sidelink UE Information message may further include a correspondence between the C-RNTI of the eRemote UE that sends the DIRECT_COMMUNICATION_REQUEST message to the eRelay UE and the local ID of the eRemote UE.

4. Implementation 4:

In detailed S903, the eRemote UE sends the DIRECT_COMMUNICATION_REQUEST message to the eRelay UE, where a C-RNTI of the eRemote UE is sent together with the DIRECT_COMMUNICATION_REQUEST message. The C-RNTI of the eRemote UE may be transmitted by using one MAC CE in a MAC PDU that carries the DIRECT_COMMUNICATION_REQUEST message.

In detailed S904, after receiving the DIRECT_COMMUNICATION_REQUEST message sent by the eRemote UE, the eRelay UE sends the Sidelink UE Information message to the base station. The Sidelink UE Information message includes the C-RNTI of the eRemote UE that sends the DIRECT_COMMUNICATION_REQUEST message to the eRelay UE. In addition, the Sidelink UE Information message may further include a layer-2 ID of the eRemote UE.

In detailed S905, after receiving the Sidelink UE Information message sent by the eRelay UE, the base station allocates one local ID to the eRemote UE. The base station sends the fourth message to the eRelay UE. The fourth message includes a correspondence between the layer-2 ID of the eRemote UE and the local ID of the eRemote UE.

S. Implementation 5:

In detailed S901, the eRemote UE sends the first message to the base station. The first message includes a layer-2 ID of the eRelay UE.

In detailed S904, after receiving the DIRECT_COMMUNICATION_REQUEST message sent by the eRemote UE, the eRelay UE allocates one local ID to the eRemote UE. The eRelay UE sends the Sidelink UE Information message to the base station. The Sidelink UE Information message includes the layer-2 ID of the eRelay UE. In addition, the Sidelink UE Information message may further include a correspondence between a layer-2 ID of the eRemote UE that sends the DIRECT_COMMUNICATION_REQUEST message to the eRelay UE and the local ID of the eRemote UE.

6. Implementation 6:

In detailed S901, the eRemote UE sends the first message to the base station. The first message includes a layer-2 ID of the eRelay UE.

In detailed S904, after receiving the DIRECT_COMMUNICATION_REQUEST message sent by the eRemote UE, the eRelay UE sends the Sidelink UE Information message to the base station. The Sidelink UE Information message includes the layer-2 ID of the eRelay UE. In addition, the Sidelink UE Information message may further include a layer-2 ID of the eRemote UE that sends the DIRECT_COMMUNICATION_REQUEST message to the eRelay UE.

In detailed S905, after receiving the Sidelink UE Information message sent by the eRelay UE, the base station allocates one local ID to the eRemote UE. The base station sends the fourth message to the eRelay UE. The fourth message includes a correspondence between the layer-2 ID of the eRemote UE and the local ID of the eRemote UE.

It should be noted that, the foregoing several implementations are not illustrated in FIG. 9.

The foregoing describes the process of the 3GPP communication connection by the eRemote UE and the eRelay UE. In the following, referring to FIG. 10, an embodiment of the present invention describes a process of establishing a communication connection by eRemote UE and eRelay UE. The communication connection in this embodiment of the present invention is a communication connection of a non-3GPP technology, for example, Bluetooth or WLAN.

S1001: The eRemote UE and the eRelay UE establish a short-range communication connection.

S1002: The eRemote UE sends a request message to the eRelay UE, where the request message is used to request the eRelay UE to provide the eRemote UE with layer 2 UE-to-NW relay support. Then, the eRelay UE receives the request message. For example, the request accept message is a layer 2 relay request (layer2 relay request) message.

S1003: The eRelay UE sends an RRC message to a base station, so as to send, to the base station, information about the eRemote UE that establishes the non-3GPP connection to the eRelay UE. Then, the base station receives the RRC message. The RRC message is non-3GPP access information (non-3GPP Access Information) in FIG. 10.

If the eRelay UE is in an RRC_IDLE state after receiving the request message sent by the eRemote UE, the eRelay UE first initiates an RRC connection establishment process, to enter an RRC_CONNECTED state. After the eRelay UE enters the RRC_CONNECTED state, the eRelay UE sends the RRC message to the base station. If the eRelay UE is already in the RRC_CONNECTED state after receiving the request message sent by the eRemote UE, the eRelay UE may directly send the RRC message to the base station.

S1004: The base station sends an RRC Connection Reconfiguration message to the eRelay UE. Then, the eRelay UE receives the RRC Connection Reconfiguration message.

S1005: The eRelay UE sends a request accept message to the eRemote UE, to notify the eRemote UE that the eRelay UE has accepted the request. Then, the eRemote UE receives the request accept message. For example, the request accept message is a layer 2 relay accept (layer 2 relay accept) message.

The request message sent by the eRemote UE in S1002 and the request accept message sent by the eRelay UE in S1006 may be RRC messages.

S1006: The eRemote UE sends a first message to the base station. Then, the base station receives the first message. The first message is used to request the base station to perform communication path switching.

S1007: The base station sends a fourth message to the eRelay UE, where the fourth message carries third bearer configuration information and an identifier of the eRemote UE. In addition, the fourth message further carries second bearer configuration information and/or second indication information.

When a base station of the eRelay UE and a base station of the eRemote UE are different base stations, the base station of the eRemote UE includes, in a sixth message to be sent to the base station of the eRelay UE, information carried in the first message in S1006.

For detailed content of S1007 and S1008, refer to the related description in the embodiment shown in FIG. 4, the embodiment shown in FIG. 5, the embodiment shown in FIG. 6, or the embodiment shown in FIG. 7. In addition, for a step following S1008, also refer to the embodiment shown in FIG. 4, the embodiment shown in FIG. 5, the embodiment shown in FIG. 6, or the embodiment shown in FIG. 7.

Similarly, in this embodiment of the present invention, after the eRemote UE and the eRelay UE establish the non-3GPP connection, the base station needs to obtain and store a correspondence between the identifier of the eRemote UE and an identifier of the eRelay UE. Based on the non-3GPP connection establishment process between the eRemote UE and the eRelay UE shown in FIG. 10, the base station obtains the identifier of the eRemote UE and the identifier of the eRelay UE in implementations including but not limited the following several implementations:

1. Implementation 1:

In detailed S1003, after receiving the layer 2 relay request message sent by the eRemote UE, the eRelay UE allocates, for the eRemote UE, one identifier that can uniquely identify the eRemote UE on the eRelay UE. The identifier may be referred to as a local ID of the eRemote UE. For a description of the identifier, refer to the embodiment shown in FIG. 8. The eRelay UE sends the non-3GPP Access Information message to the base station. The non-3GPP Access Information message includes a layer-2 ID of the eRelay UE. In addition, the non-3GPP Access Information message may further include a correspondence between a layer-2 ID of the eRemote UE that sends the layer 2 relay request message to the eRelay UE and the local ID of the eRemote UE.

In detailed S1006, the eRemote UE sends the first message to the base station. Then, the base station receives the first message. The first message includes the layer-2 ID of the eRelay UE that establishes the non-3GPP connection to the eRemote UE. In addition, the first message may further include the layer-2 ID of the eRemote UE.

2. Implementation 2:

In detailed S1003, the eRelay UE sends the non-3GPP Access Information message to the base station. The non-3GPP Access Information message includes a layer-2 ID of the eRelay UE and a layer-2 ID of the eRemote UE that sends the layer 2 relay request message to the eRelay UE.

In detailed S1004, after receiving the non-3GPP Access Information message sent by the eRelay UE, the base station allocates one local ID to the eRemote UE. The base station sends the RRC connection reconfiguration message to the eRelay UE. The RRC connection reconfiguration message includes a correspondence between the layer-2 ID of the eRemote UE and the local ID of the eRemote UE.

In detailed S1006, the eRemote UE sends the first message to the base station. Then, the base station receives the first message. The first message includes the layer-2 ID of the eRelay UE that establishes the non-3GPP connection to the eRemote UE. In addition, the first message may further include the layer-2 ID of the eRemote UE.

3. Implementation 3:

In detailed S1003, the eRelay UE sends the non-3GPP Access Information message to the base station. The non-3GPP Access Information message includes a layer-2 ID of the eRelay UE and a layer-2 ID of the eRemote UE that sends the layer 2 relay request message to the eRelay UE.

In detailed S1006, the eRemote UE sends the first message to the base station. Then, the base station receives the first message. The first message includes the layer-2 ID of the eRelay UE that establishes the non-3GPP connection to the eRemote UE. In addition, the first message may further include the layer-2 ID of the eRemote UE.

In detailed S1007, after receiving the first message sent by the eRemote UE, the base station allocates one local ID to the eRemote UE. The base station sends the fourth message to the eRelay UE. The fourth message includes a correspondence between the layer-2 ID of the eRemote UE and the local ID of the eRemote UE.

4. Implementation 4:

In detailed S1003, after receiving the layer 2 relay request message sent by the eRemote UE, the eRelay UE allocates one local ID to the eRemote UE. The eRelay UE sends the non-3GPP Access Information message to the base station. The non-3GPP Access Information message includes a correspondence between a layer-2 ID of the eRemote UE that sends the layer 2 relay request message to the eRelay UE and the local ID of the eRemote UE.

In detailed S1005, when sending the layer 2 relay accept message to the eRemote UE, the eRelay UE also notifies the identifier of the eRelay UE to the eRemote UE. The identifier of the eRelay UE may be a C-RNTI of the eRelay UE in this embodiment of the present invention. The C-RNTI of the eRelay UE may be transmitted by using one MAC CE in a MAC PDU that carries the layer 2 relay accept message.

In detailed S1006, the eRemote UE sends the first message to the base station. The first message includes the C-RNTI of the eRelay UE that establishes the non-3GPP connection to the eRemote UE. In addition, the first message may further include the layer-2 ID of the eRemote UE.

S. Implementation 5:

In detailed S1003, after receiving the layer 2 relay request message sent by the eRemote UE, the eRelay UE sends the non-3GPP Access Information message to the base station. The non-3GPP Access Information message includes a layer-2 ID of the eRemote UE that sends the layer 2 relay request message to the eRelay UE.

In detailed S1004, after receiving the non-3GPP Access Information message sent by the eRelay UE, the base station allocates one local ID to the eRemote UE. The base station sends the RRC connection reconfiguration message to the eRelay UE. The RRC connection reconfiguration message includes a correspondence between the layer-2 ID of the eRemote UE and the local ID of the eRemote UE.

In detailed S1005, when sending the layer 2 relay accept message to the eRemote UE, the eRelay UE also notifies the identifier of the eRelay UE to the eRemote UE. The identifier of the eRelay UE may be a C-RNTI of the eRelay UE in this embodiment of the present invention. The C-RNTI of the eRelay UE may be transmitted by using one MAC CE in a MAC PDU that carries the layer 2 relay accept message.

In detailed S1006, the eRemote UE sends the first message to the base station. The first message includes the C-RNTI of the eRelay UE that establishes the non-3GPP connection to the eRemote UE. In addition, the first message may further include the layer-2 ID of the eRemote UE.

6. Implementation 6:

In detailed S1003, after receiving the layer 2 relay request message sent by the eRemote UE, the eRelay UE sends the non-3GPP Access Information message to the base station. The non-3GPP Access Information message includes a layer-2 ID of the eRemote UE that sends the layer 2 relay request message to the eRelay UE.

In detailed S1005, when sending the layer 2 relay accept message to the eRemote UE, the eRelay UE also notifies the identifier of the eRelay UE to the eRemote UE. The identifier of the eRelay UE may be a C-RNTI of the eRelay UE in this embodiment of the present invention. The C-RNTI of the eRelay UE may be transmitted by using one MAC CE in a MAC PDU that carries the layer 2 relay accept message.

In detailed S1006, the eRemote UE sends the first message to the base station. The first message includes the C-RNTI of the eRelay UE that establishes the non-3GPP connection to the eRemote UE. In addition, the first message may further include the layer-2 ID of the eRemote UE.

In detailed S1007, after receiving the first message sent by the eRemote UE, the base station allocates one local ID to the eRemote UE. The base station sends the fourth message to the eRelay UE. The fourth message includes a correspondence between the layer-2 ID of the eRemote UE and the local ID of the eRemote UE.

7. Implementation 7:

In detailed S1002, the eRemote UE sends the layer 2 relay request message to the eRelay UE, where the identifier of the eRemote UE is sent together with the layer 2 relay request message. The identifier of the eRemote UE may be a C-RNTI of the eRelay UE in this embodiment of the present invention. The C-RNTI of the eRemote UE may be transmitted by using one MAC CE in a MAC PDU that carries the layer 2 relay request message.

In detailed S1003, after receiving the layer 2 relay request message of the eRemote UE, the eRelay UE allocates one local ID to the eRemote UE. The eRelay UE sends the non-3GPP Access Information message to the base station. The non-3GPP Access Information message includes the C-RNTI of the eRemote UE that sends the layer 2 relay request message to the eRelay UE. In addition, the non-3GPP Access Information message may further include a correspondence between a layer-2 ID of the eRemote UE that sends the layer 2 relay request message to the eRelay UE and the local ID of the eRemote UE.

8. Implementation 8:

In detailed S1002, the eRemote UE sends the layer 2 relay request message to the eRelay UE, where the identifier of the eRemote UE is sent together with the layer 2 relay request message. The identifier of the eRemote UE may be a C-RNTI of the eRelay UE in this embodiment of the present invention. The C-RNTI of the eRemote UE may be transmitted by using one MAC CE in a MAC PDU that carries the layer 2 relay request message.

In detailed S1003, the eRelay UE sends the non-3GPP Access Information message to the base station. The non-3GPP Access Information message includes the C-RNTI of the eRemote UE that sends the layer 2 relay request message to the eRelay UE. In addition, the non-3GPP Access Information message further includes a layer-2 ID of the eRemote UE that sends the layer 2 relay request message to the eRelay UE.

In detailed S1004, after receiving the non-3GPP Access Information message sent by the eRelay UE, the base station allocates one local ID to the eRemote UE. The base station sends the RRC connection reconfiguration message to the eRelay UE. The RRC connection reconfiguration message includes a correspondence between the layer-2 ID of the eRemote UE and the local ID of the eRemote UE.

9. Implementation 9:

In detailed S1002, the eRemote UE sends the layer 2 relay request message to the eRelay UE, where the identifier of the eRemote UE is sent together with the layer 2 relay request message. The identifier of the eRemote UE may be a C-RNTI of the eRelay UE in this embodiment of the present invention. The C-RNTI of the eRemote UE may be transmitted by using one MAC CE in a MAC PDU that carries the layer 2 relay request message.

In detailed S1003, the eRelay UE sends the non-3GPP Access Information message to the base station. The non-3GPP Access Information message includes the C-RNTI of the eRemote UE that sends the layer 2 relay request message to the eRelay UE. In addition, the non-3GPP Access Information message further includes a layer-2 ID of the eRemote UE that sends the layer 2 relay request message to the eRelay UE.

In detailed S1007, after receiving the first message sent by the eRemote UE, the base station allocates one local ID to the eRemote UE. The base station sends the fourth message to the eRelay UE. The fourth message includes a correspondence between the layer-2 ID of the eRemote UE and the local ID of the eRemote UE.

10. Implementation 10:

In detailed S1003, after receiving the layer 2 relay request message sent by the eRemote UE, the eRelay UE allocates one local ID to the eRemote UE. The eRelay UE sends the non-3GPP Access Information message to the base station. The non-3GPP Access Information message includes a correspondence between a layer-2 ID of the eRemote UE that sends the layer 2 relay request message to the eRelay UE and the local ID of the eRemote UE.

In detailed S1006, the eRemote UE sends the first message to the base station. Then, the base station receives the first message. The first message includes the layer-2 ID of the eRemote UE.

11. Implementation 11:

In detailed S1003, after receiving the layer 2 relay request message sent by the eRemote UE, the eRelay UE sends the non-3GPP Access Information message to the base station. The non-3GPP Access Information message includes a layer-2 ID of the eRemote UE that sends the layer 2 relay request message to the eRelay UE.

In detailed S1004, after receiving the non-3GPP Access Information message sent by the eRelay UE, the base station allocates one local ID to the eRemote UE. The base station sends the RRC connection reconfiguration message to the eRelay UE. The RRC connection reconfiguration message includes a correspondence between the layer-2 ID of the eRemote UE and the local ID of the eRemote UE.

In detailed S1006, the eRemote UE sends the first message to the base station. Then, the base station receives the first message. The first message includes the layer-2 ID of the eRemote UE.

12. Implementation 12:

In detailed S1003, the eRelay UE sends the non-3GPP Access Information message to the base station. The non-3GPP Access Information message includes a layer-2 ID of the eRemote UE that sends the layer 2 relay request message to the eRelay UE.

In detailed S1006, the eRemote UE sends the first message to the base station. Then, the base station receives the first message. The first message includes the layer-2 ID of the eRemote UE.

In detailed S1007, after receiving the first message sent by the eRemote UE, the base station allocates one local ID to the eRemote UE. The base station sends the fourth message to the eRelay UE. The fourth message includes a correspondence between the layer-2 ID of the eRemote UE and the local ID of the eRemote UE.

In the foregoing various implementations, the layer-2 ID of the eRemote UE and the layer-2 ID of the eRelay UE are MAC addresses in the non-3GPP access technology used by the eRemote UE and the eRelay UE.

Figure 10:
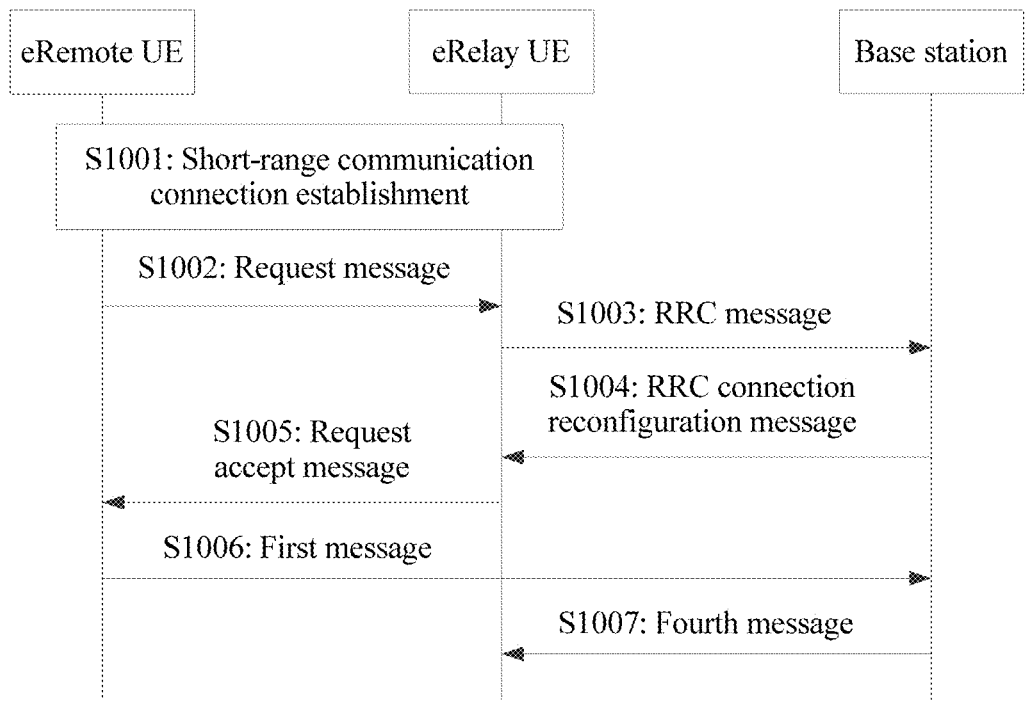
FIG. 10 is a flowchart of a process of establishing a communication connection by eRemote UE and eRelay UE by using a non-3GPP technology according to an embodiment of the present invention.

It should be noted that, the foregoing several implementations are not illustrated in FIG. 10.

In the following, an embodiment of the present invention provides a communication path switching method. This embodiment of the present invention describes a special case: eRemote UE sends a path switching request message to a first base station, to be specific, the eRemote UE sends a first message to the first base station. In t ms after the eRemote UE sends the first message to the first base station, the eRemote UE receives an RRC connection reconfiguration message that is sent by the first base station and that includes mobility control information (Mobility Control Info). The RRC connection reconfiguration message is used to instruct the eRemote UE to hand over to a third base station. However, if a value of t is relatively small, to be specific, the first base station may not have received the path switching request message sent by the eRemote UE when the first base station sends a handover request message to the third base station, in this case, after the eRemote UE is handed over to the third base station, the third base station does not know the path switching request of the eRemote UE. In this case, the eRemote UE needs to perform the following processing.

Generally, the base station measures communication quality between the base station and the eRemote UE. If the first base station determines that channel quality between the first base station and the eRemote UE is relatively poor, or due to some other reasons such as relatively heavy load on the first base station, the first base station proactively sends the RRC connection reconfiguration message including the mobility control info to the eRemote UE, to instruct the eRemote UE to hand over to the third base station. Then, if the eRemote UE sends the first message to the first base station, and receives, t ms after sending the first message, the RRC connection reconfiguration message that is sent by the first base station and that includes the mobility control information, the eRemote UE may determine, based on a length of t, whether the first base station has sent the path switching request message to the third base station. If t is greater than or equal to T, the RRC connection reconfiguration message may be considered as a second message, and the eRemote UE may perform processing according to the method described in the embodiment shown in FIG. 5 or the embodiment shown in FIG. 7. In this case, the third base station and a second base station that serves eRelay UE may be a same base station.

However, if the eRemote UE determines that t is less than T, the eRemote UE is first handed over based on the RRC connection reconfiguration message, to be specific, handed over from the first base station to the third base station. For a handover process of the eRemote UE, refer to the prior art. Details are not described again. After the eRemote UE is handed over from the first base station to the third base station, the eRemote UE sends the first message to the third base station, because the third base station does not know that the eRemote UE needs to perform communication path switching. Therefore, the eRemote UE retransmits the first message in a new serving cell, to request for communication path switching again. In this case, the third base station and a second base station that serves eRelay UE may be a same base station or may be different base stations. For details about how the eRemote UE performs communication path switching, refer to the description of any of the embodiments shown in FIG. 4 to FIG. 7. Details are not described again. In this manner, it is ensured that the eRemote UE can smoothly complete communication path switching.

A length of T may be pre-defined by a standard or a protocol, or may be configured by the base station for the eRemote UE by using a dedicated message, a system message, or the like.

The following describes devices provided in the embodiments of the present invention with reference to accompanying drawings.

Figure 11:
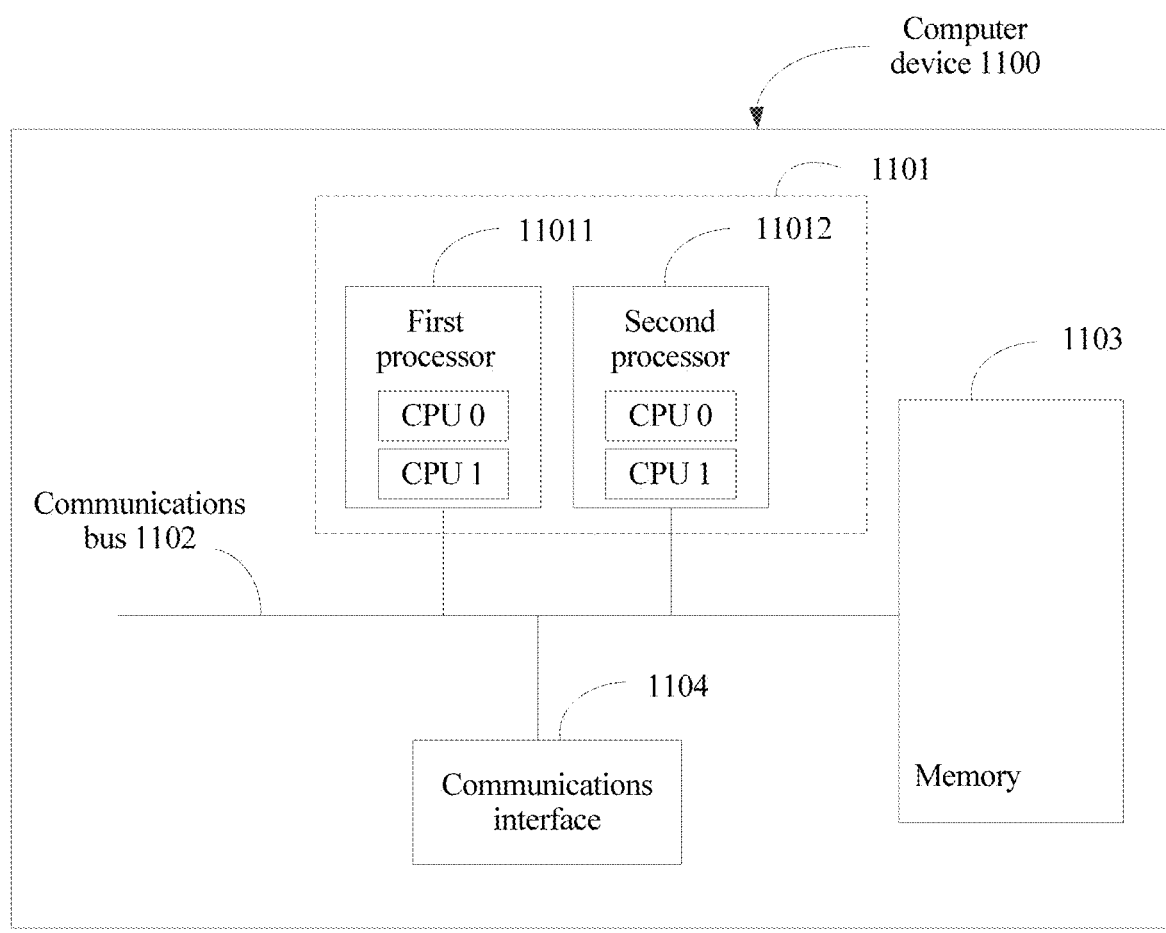
FIG. 11 is a schematic structural diagram of a computer device according to an embodiment of the present invention.

FIG. 11 is a schematic diagram of a computer device 1100 according to an embodiment of the present invention. The computer device 1100 includes at least one processor 1101, a communications bus 1102, a memory 1103, and at least one communications interface 1104. In this embodiment of the present invention, the computer device 1100 shown in FIG. 11 may be configured to implement the first user equipment according to any one of the embodiments shown in FIG. 4 to FIG. 10, namely eRemote UE, or may be configured to implement the second user equipment according to any one of the embodiments shown in FIG. 4 to FIG. 10, namely, eRelay UE, or may be configured to implement the network device or the first network device according to any one of the embodiments shown in FIG. 4 to FIG. 10, namely, a base station or a first base station.

The processor 1101 may be a general-purpose central processing unit (CPU), a microprocessor, an application-specific integrated circuit (Application-Specific Integrated Circuit, ASIC), or one or more integrated circuits used to control program execution in the embodiments of the present invention.

The communications bus 1102 may include a path in which information is transmitted between the foregoing components. The communications interface 1104 may be any apparatus of a transceiver type, and is configured to communicate with another device or communications network, such as an Ethernet, a radio access network (RAN), or a wireless local area network (Wireless Local Area Networks, WLAN).

The memory 1103 may be a read-only memory (read-only memory, ROM) or another type of static storage device that can store static information and instructions, a random access memory (random access memory, RAM) or another type of dynamic storage device that can store information and instructions; and may also be an electrically erasable programmable read-only memory (Electrically Erasable Programmable Read-Only Memory, EEPROM), a compact disc read-only memory (Compact Disc Read-Only Memory, CD-ROM), or other compact disc storages, optical disc storages (including a compact disc, a laser disc, an optical disc, a digital versatile disc, and a Blu-ray disc, or the like), and a magnetic disk storage medium or another magnetic disk storage device, or any other medium that can be used to carry or store expected program code in an instruction or data structure form and that can be accessed by a computer. However, no limitation is imposed herein. The memory 1103 may exist independently and is connected to the processor 1101 by using the bus. Alternatively, the memory 1103 may be integrated with the processor 1101.

The memory 1103 is configured to store application program code used for executing the solution of the present invention, and the processor 1101 controls the execution. The processor 1101 is configured to execute the application program code stored in the memory 1103. If the first user equipment, the second user equipment, or the first network device is implemented by using the computer device 1100, the memory 1103 of the first user equipment, the second user equipment, or the first network device may store one or more software modules, and the first user equipment, the second user equipment, or the first network device may implement the stored software module by using the processor 1101 and the program code in the memory 1103, to implement communication path switching.

In specific implementation, as an embodiment, the processor 1101 may include one or more CPUs such as a CPU 0 and a CPU 1 in FIG. 11.

In specific implementation, as an embodiment, the computer device 1100 may include a plurality of processors 1101, such as a first processor 11011 and a second processor 11012 in FIG. 11. The first processor 11011 and the second processor 11012 are named differently and denoted in accompanying drawings differently only to differentiate between the plurality of processors 1101. Each of these processors 1101 may be a single-core (single-CPU) processor 1101 or may be a multi-core (multi-CPU) processor 1101. The processor 1101 herein may be one or more devices, circuits, and/or processing cores used to process data (for example, a computer program instruction).

The foregoing computer device 1100 may be a general-purpose computer device or a dedicated computer device. A type of the computer device 1100 is not limited in this embodiment of the present invention.

Figure 12:
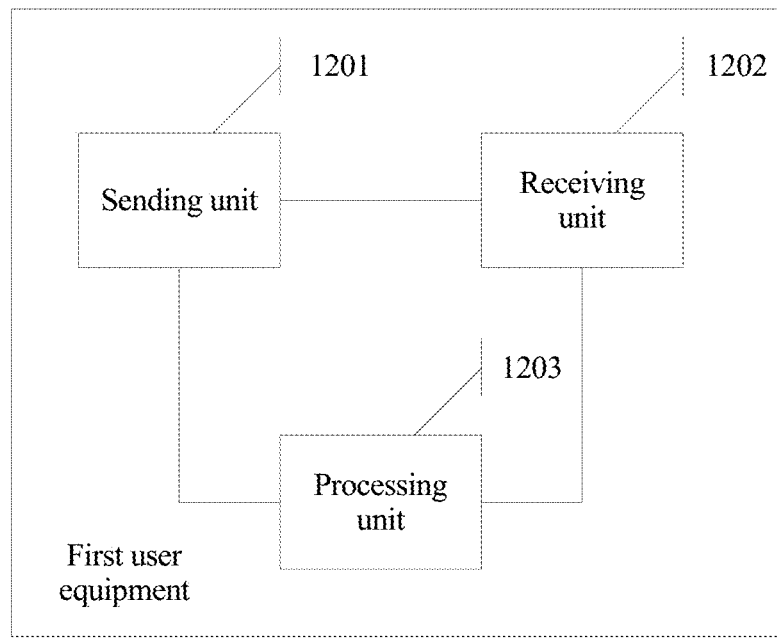
FIG. 12 is a schematic structural diagram of first user equipment according to an embodiment of the present invention.

Referring to FIG. 12, an embodiment of the present invention provides user equipment. The user equipment includes a sending unit 1201, a receiving unit 1202, and a processing unit 1203.

The sending unit 1201 is configured to send a first message to a first network device, where the first message is used to request to switch a communication path between the user equipment and the first network device from a direct path to an indirect path used for communicating with a second network device by using second user equipment; the first message includes at least one of a cell identity of a serving cell of the second user equipment, an identifier of the second user equipment, an identifier of the user equipment, and a communication technology used by a communication link between the user equipment and the second user equipment; and the first network device and the second network device are a same network device or different network devices;

the receiving unit 1202 is configured to receive a second message sent by the first network device, where the second message carries at least one of first bearer configuration information and first indication information that is used to instruct the user equipment to perform the communication path switching; and the processing unit 1203 is configured to perform the communication path switching based on the first indication information.

In a possible implementation, the first bearer configuration information includes a mapping relationship between at least one first radio bearer and at least one second radio bearer, and configurations of a radio link control entity and a logical channel that are corresponding to the at least one first radio bearer; the first radio bearer is a radio bearer used for the communication link between the user equipment and the second user equipment; and the second radio bearer is a radio bearer used for a communication link between the second user equipment and the second network device.

In a possible implementation, the processing unit 1203 is further configured to:

after the receiving unit 1202 receives the second message sent by the first network device, if the second message includes the first indication information, enable an adaptation layer used for processing data that is transmitted between the user equipment and the second network device by using the second user equipment; and if the second message includes the first bearer configuration information, reconfigure the radio link control entity and the logical channel of the first radio bearer based on the first bearer configuration information.

In a possible implementation, the processing unit 1203 is further configured to:

before the sending unit 1201 sends the first message to the first network device, establish a communication connection to the second user equipment.

In a possible implementation, the processing unit 1203 is further configured to:

after the receiving unit 1202 receives the second message sent by the first network device, establish a communication connection to the second user equipment.

In a possible implementation, the second network device and the first network device are a same network device;

the processing unit 1203 is further configured to: after the receiving unit 1202 receives the second message sent by the first network device, continue data communication with the first network device by using the direct path; and establish the communication connection to the second user equipment;

the sending unit 1201 is further configured to send a third message to the first network device by using the second user equipment, where the third message is used to indicate that a process of the communication path switching has been completed; and the processing unit 1203 is further configured to disconnect the direct path from the first network device.

In a possible implementation, the second network device and the first network device are different network devices, and the second message includes information used to instruct the user equipment to hand over to the second network device;

the processing unit 1203 is further configured to: after the receiving unit 1202 receives the second message sent by the first network device, continue data communication with the first network device by using the direct path; and establish the communication connection to the second user equipment;

the sending unit 1201 is further configured to send a third message to the second network device by using the second user equipment, where the third message is used to indicate that a process of the communication path switching has been completed; and the processing unit 1203 is further configured to disconnect the direct path from the first network device.

In a possible implementation, the second network device and the first network device are different network devices, and the second message includes information used to instruct the user equipment to hand over to the second network device;

the processing unit 1203 is further configured to: after the receiving unit 1202 receives the second message sent by the first network device, hand over from the first network device to the second network device based on an indication of the second message; and establish the communication connection to the second user equipment; and the sending unit 1201 is further configured to send a third message to the second network device by using the second user equipment, where the third message is used to indicate that a process of the communication path switching has been completed.

In a possible implementation, the processing unit 1203 is further configured to:

obtain the cell identity of the serving cell of the second user equipment and the identifier of the second user equipment in a discovery process between the user equipment and the second user equipment; or obtain the cell identity of the serving cell of the second user equipment and the identifier of the second user equipment in a process of establishing the communication connection to the second user equipment; or obtain the cell identity of the serving cell of the second user equipment and the identifier of the second user equipment after establishing the communication connection to the second user equipment.

In actual application, entity devices corresponding to the sending unit 1201 and the receiving unit 1202 each may be the communications interface 1104 in FIG. 11, and an entity device corresponding to the processing unit 1203 may be the processor 1101 in FIG. 11. It may be considered that, when the user equipment is implemented by using the computer device 1100 shown in FIG. 11, in the communications interfaces 1104 in FIG. 11, some communications interfaces 1104 implement a function of the receiving unit 1202, and some communications interfaces 1104 can implement a function of the sending unit 1201. Alternatively, it may be considered that, in the communications interfaces 1104 in FIG. 11, each communications interface 1104 may implement both a function of the receiving unit 1202 and a function of the sending unit 1201.

The user equipment may be configured to execute the method according to any one of the embodiments shown in FIG. 2A and FIG. 2B to FIG. 10, for example, may be the foregoing first user equipment, for example, the eRemote UE. Therefore, for functions and the like implemented by the units in the user equipment, refer to the description in the foregoing method part. Details are not described again.

Figure 13:
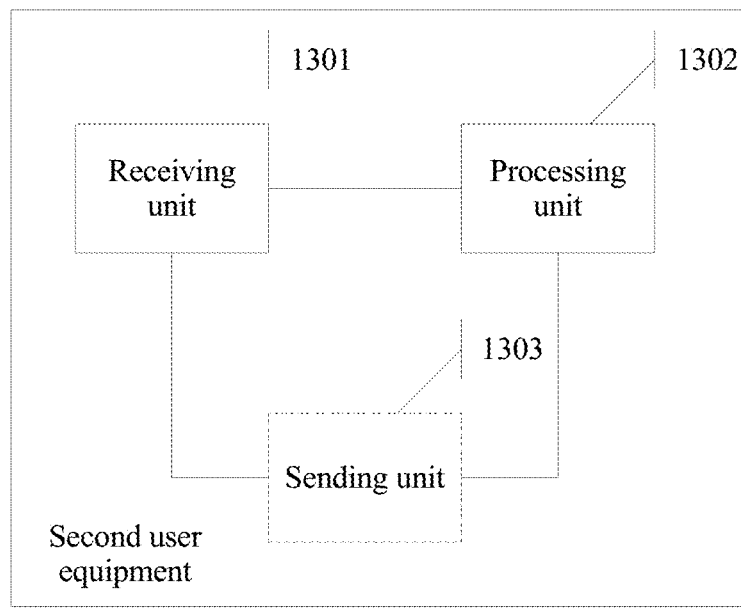
FIG. 13 is a schematic structural diagram of second user equipment according to an embodiment of the present invention.

Referring to FIG. 13, an embodiment of the present invention provides user equipment. The user equipment includes a receiving unit 1301 and a processing unit 1302.

The receiving unit 1301 is configured to receive a fourth message sent by a second network device, where the fourth message carries third bearer configuration information, an identifier of first user equipment, and second bearer configuration information and/or second indication information that is used to instruct the user equipment to provide the first user equipment with indirect-path support; and the processing unit 1302 is configured to configure a radio bearer of a communication link between the user equipment and the first user equipment based on the identifier of the first user equipment and the second bearer configuration information and/or the second indication information, and configure, based on the identifier of the first user equipment and the third bearer configuration information, a radio bearer used for transmitting data and signaling of the first user equipment on a communication link between the user equipment and the second network device.

In a possible implementation, the second bearer configuration information includes a mapping relationship between at least one third radio bearer and at least one fourth radio bearer, and configurations of a radio link control entity and a logical channel that are corresponding to the at least one third radio bearer; and the third bearer configuration information includes configurations of a radio link control entity and a logical channel that are corresponding to the at least one fourth radio bearer, where the third radio bearer is a radio bearer used for transmitting the data and the signaling of the first user equipment on the communication link between the user equipment and the first user equipment, and the fourth radio bearer is a radio bearer used for transmitting the data and the signaling of the first user equipment on the communication link between the user equipment and the second network device.

In a possible implementation, that the processing unit 1302 configures a radio bearer of a communication link between the user equipment and the first user equipment based on the identifier of the first user equipment and the second bearer configuration information and/or the second indication information, and configures, based on the identifier of the first user equipment and the third bearer configuration information, a radio bearer used for transmitting data and signaling of the first user equipment on a communication link between the user equipment and the second network device includes:

if the fourth message includes the second indication information, enabling a first adaptation layer used for processing data that is transmitted between the first user equipment and the second network device;

if the fourth message includes the second bearer configuration information, establishing the radio link control entity and the logical channel that are corresponding to the at least one third radio bearer; and re-establishing or reconfiguring the radio link control entity and the logical channel that are corresponding to the at least one fourth radio bearer, and enabling a second adaptation layer used for processing data transmitted on the fourth radio bearer.

In a possible implementation, the user equipment further includes a sending unit 1303, which is not illustrated in FIG. 13. Because the sending unit 1303 is an optional functional unit, the sending unit 1303 is denoted by using a dashed line in FIG. 13, to differentiate from mandatory functional units. The sending unit 1303 is configured to:

send a cell identity of a serving cell of the user equipment and an identifier of the user equipment to the first user equipment in a discovery process between the user equipment and the first user equipment; or send a cell identity of a serving cell of the user equipment and an identifier of the user equipment to the first user equipment in a process of establishing a communication connection to the first user equipment; or send a cell identity of a serving cell of the user equipment and an identifier of the user equipment to the first user equipment after establishing a communication connection to the first user equipment.

Referring to FIG. 13, in a possible implementation, the user equipment further includes the sending unit 1303.

The processing unit 1302 is further configured to obtain the identifier of the first user equipment; and the sending unit 1303 is configured to send a fifth message to the network device, where the fifth message carries at least one of the identifier of the first user equipment and the identifier of the user equipment.

In actual application, entity devices corresponding to the sending unit 1303 and the receiving unit 1301 each may be the communications interface 1104 in FIG. 11, and an entity device corresponding to the processing unit 1203 may be the processor 1101 in FIG. 11. It may be considered that, when the user equipment is implemented by using the computer device 1100 shown in FIG. 11, in the communications interfaces 1104 in FIG. 11, some communications interfaces 1104 implement a function of the receiving unit 1301, and some communications interfaces 1104 can implement a function of the sending unit 1303. Alternatively, it may be considered that, in the communications interfaces 1104 in FIG. 11, each communications interface 1104 may implement both a function of the receiving unit 1301 and a function of the sending unit 1303.

The user equipment may be configured to execute the method according to any one of the embodiments shown in FIG. 2A and FIG. 2B to FIG. 10, for example, may be the foregoing second user equipment, for example, the eRelay UE. Therefore, for functions and the like implemented by the units in the user equipment, refer to the description in the foregoing method part. Details are not described again.

Figure 14:
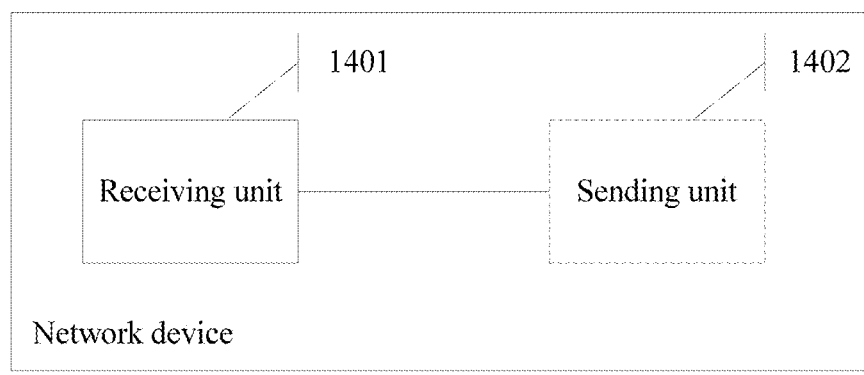
FIG. 14 is a schematic structural diagram of a network device according to an embodiment of the present invention.

Referring to FIG. 14, an embodiment of the present invention provides a network device. The network device includes a receiving unit 1401 and a sending unit 1402.

The receiving unit 1401 is configured to receive a first message sent by first user equipment, where the first message is used to request to switch a communication path between the first user equipment and the network device from a direct path to an indirect path used for communicating with a second network device by using second user equipment; the first message includes at least one of a cell identity of a serving cell of the second user equipment, an identifier of the second user equipment, an identifier of the first user equipment, and a communication technology used by a communication link between the first user equipment and the second user equipment; and the network device and the second network device are a same network device or different network devices; and the sending unit 1402 is configured to send a second message to the first user equipment, where the second message carries first indication information used to instruct the first user equipment to perform the communication path switching.

In a possible implementation, the second message further carries first bearer configuration information; the first bearer configuration information includes a mapping relationship between at least one first radio bearer and at least one second radio bearer, and configurations of a radio link control entity and a logical channel that are corresponding to the at least one first radio bearer; the first radio bearer is a radio bearer used for the communication link between the first user equipment and the second user equipment; and the second radio bearer is a radio bearer used for a communication link between the second user equipment and the second network device.

In a possible implementation, the sending unit 1402 is further configured to, after the receiving unit 1401 receives the first message sent by the first user equipment, send a fourth message to the second user equipment, where the fourth message carries second bearer configuration information and/or second indication information that is used to instruct the second user equipment to provide the first user equipment with indirect-path support, and the second bearer configuration information is used by the second user equipment to configure a radio bearer.

In a possible implementation, the second bearer configuration information includes a mapping relationship between at least one third radio bearer and at least one fourth radio bearer, configurations of a radio link control entity and a logical channel that are corresponding to the at least one third radio bearer, and configurations of a radio link control entity and a logical channel that are corresponding to the at least one fourth radio bearer; and the third radio bearer is a radio bearer used for the communication link between the second user equipment and the first user equipment, and the fourth radio bearer is a radio bearer used for the communication link between the second user equipment and the second network device.

In a possible implementation, the network device and the second network device are a same network device;

the sending unit 1402 is further configured to: before sending the second message to the first user equipment, if the cell identity of the serving cell of the second user equipment that is carried in the first message indicates that the serving cell is a cell deployed on the second network device, send a sixth message to the second network device, where the sixth message is used to request to hand over the first user equipment from the network device to the second network device, and the sixth message carries information carried in the first message; and the receiving unit 1401 is further configured to receive a seventh message sent by the second network device, where the seventh message carries the first bearer configuration information.

In actual application, entity devices corresponding to the sending unit 1402 and the receiving unit 1401 each may be the communications interface 1104 in FIG. 11. It may be considered that, when the user equipment is implemented by using the computer device 1100 shown in FIG. 11, in the communications interfaces 1104 in FIG. 11, some communications interfaces 1104 implement a function of the receiving unit 1401, and some communications interfaces 1104 can implement a function of the sending unit 1402. Alternatively, it may be considered that, in the communications interfaces 1104 in FIG. 11, each communications interface 1104 may implement both a function of the receiving unit 1401 and a function of the sending unit 1402.

The network device may be configured to execute the method according to any one of the embodiments shown in FIG. 2A and FIG. 2B to FIG. 10, for example, may be the foregoing base station or first base station. Therefore, for functions and the like implemented by the units in the user equipment, refer to the description in the foregoing method part. Details are not described again.

In this embodiment of the present invention, if the first user equipment requests to perform path switching, the network device sends the second message to the first user equipment, to instruct the first user equipment to switch the communication path from the direct path to the indirect path. In other words, the first user equipment does not autonomously determine when to perform the switching; instead, the network device indicates to the first user equipment when to perform the path switching. Therefore, the network device may perform scheduling based on a service, to ensure service continuity as far as possible before and after the first user equipment performs the path switching.

An embodiment of the present invention further provides a computer storage medium. The computer storage medium stores a program. The program executes all steps executed by the first user equipment (namely, the eRemote UE) described in any of the foregoing method embodiments.

An embodiment of the present invention further provides a computer storage medium. The computer storage medium stores a program. The program executes all steps executed by the second user equipment (namely, the eRelay UE) described in any of the foregoing method embodiments.

An embodiment of the present invention further provides a computer storage medium. The computer storage medium stores a program. The program executes all steps executed by the first network device (namely, the base station, or the first base station in some embodiments) described in any of the foregoing method embodiments.

A person skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a magnetic disk memory, a CD-ROM, an optical memory, and the like) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of the present invention without departing from the spirit and scope of this application. This application is intended to cover these modifications and variations provided that they fall within the scope of protection defined by the following claims and their equivalent technologies.

What is claimed is:

1. A method, comprising:
    establishing, by first user equipment, a communication connection to second user equipment;
    after establishing the communication connection to the second user equipment, sending, by the first user equipment using a direct path between the first user equipment and a first network device, a first message to the first network device, wherein the first message requests to switch a communication path between the first user equipment and the first network device from the direct path to an indirect path, wherein the indirect path is a communication path between the first user equipment and a second network device in which messages are relayed by the second user equipment, the first network device and the second network device are a same network device or different network devices, and the first message comprises:
        a cell identity of a serving cell of the second user equipment;
        an identifier of the second user equipment;
        an identifier of the first user equipment; or an indication of a communication technology used by a communication link between the first user equipment and the second user equipment;

receiving, by the first user equipment, a second message sent by the first network device, wherein the second message carries first bearer configuration information or first indication information, and the first bearer configuration information or the first indication information instructs the first user equipment to perform the communication path switching; and performing, by the first user equipment, the communication link switching based on the first bearer configuration information or the first indication information;

wherein the first bearer configuration information comprises a mapping relationship between a first radio bearer and a second radio bearer, a configuration of a radio link control entity corresponding to the first radio bearer, and a configuration of a logical channel corresponding to the first radio bearer;

wherein the first radio bearer is used for the communication link between the first user equipment and the second user equipment; and wherein the second radio bearer is used for a communication link between the second user equipment and the second network device.

2. The method according to claim 1, further comprising:
after receiving, by the first user equipment, the second message sent by the first network device, performing the following:
when the second message comprises the first indication information, enabling, by the first user equipment, an adaptation layer used for processing data that is relayed by the second user equipment while being transmitted between the first user equipment and the second network device; and
when the second message comprises the first bearer configuration information, reconfiguring, by the first user equipment, the radio link control entity and the logical channel of the first radio bearer based on the first bearer configuration information.

3. The method according to claim 1, wherein:
the second network device and the first network device are a same network device; and
after receiving, by the first user equipment, the second message sent by the first network device, the method further comprises:
continuing, by the first user equipment, data communication with the first network device using the direct path;
sending, by the first user equipment, a third message to the second user equipment to relay to the first network device, wherein the third message indicates that a process of the communication path switching has been completed; and
disconnecting, by the first user equipment, the direct path from the first network device.

4. The method according to claim 1, wherein:
the second network device and the first network device are different network devices, and the second message comprises information instructing the first user equipment to hand over to the second network device; and
the method further comprises:
after receiving, by the first user equipment, the second message sent by the first network device, continuing, by the first user equipment, data communication with the first network device using the direct path;

sending, by the first user equipment, a third message to the second user equipment to relay to the second network device, wherein the third message indicates that a process of the communication path switching has been completed; and
disconnecting, by the first user equipment, the direct path from the first network device.

5. The method according to claim 1, wherein:
the second network device and the first network device are different network devices, and the second message comprises information instructing the first user equipment to hand over to the second network device; and
the method further comprises:
after receiving, by the first user equipment, the second message sent by the first network device, handing over, by the first user equipment, from the first network device to the second network device based on an indication of the second message; and
sending, by the first user equipment, a third message to the second user equipment to relay to the second network device, wherein the third message indicates that a process of the communication path switching has been completed.

6. The method according to claim 1, further comprising:
obtaining, by the first user equipment, the cell identity of the serving cell of the second user equipment and the identifier of the second user equipment in a discovery process between the first user equipment and the second user equipment; or
obtaining, by the first user equipment, the cell identity of the serving cell of the second user equipment and the identifier of the second user equipment in a process of establishing the communication connection to the second user equipment; or
obtaining, by the first user equipment, the cell identity of the serving cell of the second user equipment and the identifier of the second user equipment after establishing the communication connection to the second user equipment.

7. A method, comprising:
receiving, by second user equipment, a fourth message sent by a second network device, wherein the fourth message carries third bearer configuration information, an identifier of first user equipment, and second bearer configuration information or second indication information, wherein the second bearer configuration information or the second indication information instructs the second user equipment to provide the first user equipment with indirect-path support; and
configuring, by the second user equipment based on the identifier of the first user equipment, and based on the second bearer configuration information or the second indication information, a radio bearer of a communication link between the second user equipment and the first user equipment;
configuring, by the second user equipment based on the identifier of the first user equipment and the third bearer configuration information, a radio bearer used for transmitting data and signaling of the first user equipment on a communication link between the second user equipment and the second network device;
wherein the second bearer configuration information comprises a mapping relationship between a third radio bearer and a fourth radio bearer, a configuration of a radio link control entity corresponding to the third radio bearer, and a configuration of a logical channel corresponding to the third radio bearer;
wherein the third bearer configuration information comprises a configuration of a radio link control entity corresponding to the fourth radio bearer, and a configuration of a logical channel corresponding to the fourth radio bearer; and
wherein the third radio bearer is used for transmitting the data and the signaling of the first user equipment on the communication link between the second user equipment and the first user equipment, and the fourth radio bearer is used for transmitting the data and the signaling of the first user equipment on the communication link between the second user equipment and the second network device.

8. The method according to claim 7, wherein configuring, by the second user equipment based on the identifier of the first user equipment, and based on the second bearer configuration information or the second indication information, the radio bearer of the communication link between the second user equipment and the first user equipment, and configuring, based on the identifier of the first user equipment, and the third bearer configuration information, the radio bearer used for transmitting data and signaling of the first user equipment on the communication link between the second user equipment and the second network device, comprises:
when the fourth message comprises the second indication information, enabling, by the second user equipment, a first adaptation layer used for processing data that is transmitted between the first user equipment and the second network device;
when the fourth message comprises the second bearer configuration information, establishing, by the second user equipment, the radio link control entity corresponding to the third radio bearer and the logical channel corresponding to the third radio bearer; and
re-establishing or reconfiguring, by the second user equipment, the radio link control entity corresponding to the fourth radio bearer and the logical channel corresponding to the fourth radio bearer, and enabling a second adaptation layer used for processing data transmitted on the fourth radio bearer.

9. The method according to claim 7, further comprising:
sending, by the second user equipment, a cell identity of a serving cell of the second user equipment and an identifier of the second user equipment to the first user equipment in a discovery process between the second user equipment and the first user equipment; or
sending, by the second user equipment, a cell identity of a serving cell of the second user equipment and an identifier of the second user equipment to the first user equipment in a process of establishing a communication connection to the first user equipment; or
sending, by the second user equipment, a cell identity of a serving cell of the second user equipment and an identifier of the second user equipment to the first user equipment after establishing a communication connection to the first user equipment.

10. The method according to claim 7, further comprising:
obtaining, by the second user equipment, the identifier of the first user equipment; and
sending, by the second user equipment, a fifth message to the second network device, wherein the fifth message carries the identifier of the first user equipment or the identifier of the second user equipment.

11. A method, comprising:
receiving, by a first network device, a first message sent by first user equipment, wherein the first message requests to switch a communication path between the first user equipment and the first network device from a direct path to an indirect path, wherein the indirect path is a communication path between the first user equipment and a second network device in which messages are relayed by second user equipment, the first network device and the second network device are a same network device or different network devices, and the first message comprises:
a cell identity of a serving cell of the second user equipment;
an identifier of the second user equipment;
an identifier of the first user equipment; or
an indication of a communication technology used by a communication link between the first user equipment and the second user equipment; and
sending, by the first network device, a second message to the first user equipment, wherein the second message carries first indication information instructing the first user equipment to perform the communication path switching, and the second message further carries first bearer configuration information, and wherein:
the first bearer configuration information comprises a mapping relationship between a first radio bearer and a second radio bearer, a configuration of a radio link control entity corresponding to the first radio bearer, and a configuration of logical channel corresponding to the first radio bearer,
the first radio bearer is used for the communication link between the first user equipment and the second user equipment; and
the second radio bearer is used for a communication link between the second user equipment and the second network device.

12. The method according to claim 11, wherein:
the first network device and the second network device are different network devices; and
the method further comprises:
before the sending, by the first network device, the second message to the first user equipment, performing the following:
when the cell identity of the serving cell of the second user equipment that is carried in the first message indicates that the serving cell is a cell deployed on the second network device, sending, by the first network device, a sixth message to the second network device, wherein the sixth message requests to hand over the first user equipment from the first network device to the second network device, and the sixth message carries information carried in the first message; and
receiving, by the first network device, a seventh message sent by the second network device, wherein the seventh message carries the first bearer configuration information.

13. The method according to claim 11, further comprising:
after receiving, by the first network device, the first message sent by first user equipment, sending, by the first network device, a fourth message to the second user equipment, wherein the fourth message carries second bearer configuration information or second indication information, the second bearer configuration information or the second indication information instructs the second user equipment to provide the first user equipment with indirect-path support, and the second bearer configuration information is used by the second user equipment to configure a third radio bearer.

14. The method according to claim 13, wherein:

the second bearer configuration information comprises a mapping relationship between the third radio bearer and a fourth radio bearer, a configuration of a radio link control entity corresponding to the third radio bearer, a configuration of a logical channel corresponding to the third radio bearer, a configuration of a radio link control entity corresponding to the fourth radio bearer, and a configuration of a logical channel corresponding to the fourth radio bearer; and the third radio bearer is used for the communication link between the second user equipment and the first user equipment, and the fourth radio bearer is used for the communication link between the second user equipment and the second network device.

15. The method according to claim 11, wherein the first message comprises the cell identity of the serving cell of the second user equipment.

16. The method according to claim 11, wherein the first message comprises the identifier of the second user equipment.

17. The method according to claim 11, wherein the first message comprises the identifier of the first user equipment.

* * * * *